US012758976B2

(12) United States Patent
Han et al.

(10) Patent No.: US 12,758,976 B2
(45) Date of Patent: Oct. 13, 2026

(54) ULTRA HIGH EFFICIENCY MICROFLUIDIC PLATFORM

(71) Applicant: THE TEXAS A&M UNIVERSITY SYSTEM, College Station, TX (US)

(72) Inventors: Arum Han, College Station, TX (US); Adrian Guzman, College Station, TX (US); Han Zhang, College Station, TX (US); Jose Wippold, College Station, TX (US); Jing Dai, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 208 days.

(21) Appl. No.: 18/820,655

(22) Filed: Aug. 30, 2024

(65) Prior Publication Data

US 2024/0416348 A1 Dec. 19, 2024

Related U.S. Application Data

(63) Continuation of application No. 18/382,591, filed on Oct. 23, 2023, now Pat. No. 12,121,900, which is a continuation of application No. 17/239,456, filed on Apr. 23, 2021, now Pat. No. 11,794,188.

(60) Provisional application No. 63/014,311, filed on Apr. 23, 2020.

(51) Int. Cl.
*B01L 3/00* (2006.01)

(52) U.S. Cl.
CPC ... *B01L 3/502784* (2013.01); *B01L 2200/027* (2013.01); *B01L 2200/0647* (2013.01); *B01L 2200/12* (2013.01); *B01L 2200/16* (2013.01); *B01L 2400/086* (2013.01)

(58) Field of Classification Search
CPC ....... B01L 2200/027; B01L 2200/0647; B01L 2200/0652; B01L 2200/12; B01L 2200/16; B01L 2300/0883; B01L 2400/0436; B01L 2400/0442; B01L 2400/086; B01L 3/502784
See application file for complete search history.

(56) References Cited

U.S. PATENT DOCUMENTS

2010/0137163 A1* 6/2010 Link .................... C12Q 1/6876
506/40

* cited by examiner

*Primary Examiner* — Jennifer Wecker
(74) *Attorney, Agent, or Firm* — Womble Bond Dickinson (US) LLP

(57) ABSTRACT

A combination micro/macro-fluidic analysis system with one or more of a droplet transition unit, a droplet cleaving unit, a droplet synchronization, and a merging unit to enable highly efficient complex droplet microfluidic assays.

18 Claims, 25 Drawing Sheets

142 droplets/sec 1182 droplets/sec 13 droplets/sec

ULTRA HIGH EFFICIENCY MICROFLUIDIC PLATFORM

CROSS-REFERENCE TO RELATED APPLICATIONS

This application is a continuation of U.S. Non-Provisional application Ser. No. 18/382,591, filed Oct. 23, 2023, titled "ULTRA HIGH EFFICIENCY MICROFLUIDIC PLATFORM," which is a continuation of U.S. Non-Provisional application Ser. No. 17/239,456, filed Apr. 23, 2021, now U.S. Pat. No. 11,794,188, issued Oct. 24, 2023, titled "ULTRA HIGH EFFICIENCY MICROFLUIDIC PLATFORM," which claims the benefit of and priority to U.S. Provisional Application No. 63/014,311, filed on Apr. 23, 2020, the disclosures of all of which are incorporated herein by reference in their entireties.

STATEMENT REGARDING FEDERALLY SPONSORED RESEARCH OR DEVELOPMENT

This invention was made with government support under Contract No. W911NF1920013 awarded by the Defense Advanced Research Project Agency of the United States Department of Defense. The government has certain rights in the invention.

TECHNICAL FIELD

The disclosure relates to droplet generation and manipulation in microfluidic systems and applications of such systems.

BACKGROUND

In complex microfluidic systems, high-efficiency multistep sample/reagent processing is required to develop integrated devices capable of robust operations. In large library screening applications, maximizing processing efficiency and minimizing error rates are important. Particularly, assays entailing sequential processing steps require high-efficiency processing at each step, as errors in any individual step can be compounded, increasing the overall system error rate, and thus increasing the false positive and false negative rates in screening outcomes. Thus, an ultra-high efficiency screening platform is important to ensure that rare events and/or materials of interest can be accurately screened, identified, selected, and recovered.

Droplet microfluidic systems utilize a high-throughput emulsification process to produce monodispersed two-phase emulsions (droplets) that function as individual pico-liter-volume bioreactors. These droplets, which can encapsulate various target materials such as reagents, cells, and microbeads, can be handled and manipulated at extremely high throughputs. The advantages of high-throughput, small-volume, and single-cell/single-bead manipulation capabilities of this technology provide substantial advantages over conventional robotic liquid handling or other continuous flow microfluidic-based approaches. Almost all liquid handling steps can be now performed in a droplet format, such as droplet generation, droplet merging, droplet splitting, droplet detection, droplet sorting, and in-droplet cell/bead manipulation, to name a few. These functions and systems have now been extensively developed and utilized in a broad range of life science applications, both for cell-based and reagent-based assays.

Three major challenges remain that prevent droplet microfluidic systems from being used in an even broader range of applications and performing more complex multi-step assays. First, many biological assays require multiple liquid-handling steps to be conducted in a sequential manner. Despite the fact that droplet microfluidic systems can conduct almost all liquid handling steps in a droplet format, linking more than a few droplet manipulation steps in series remains a major technical challenge. This is because any error in an assay step adds to the overall system error (e.g., sequentially linking just two steps each having a 5% error rate results in an overall system error rate of 9.75%), thus the overall system efficiency becomes exponentially lower as the error rates add up in a sequential assay. This is especially problematic in applications requiring high-throughput screening of large libraries, where high false-positive and/or high false-negative rates would mean that a very large number of potential "hits" have to be re-screened and confirmed, or a very large number of "real hits" may be missed. Thus, minimizing the error rate in every droplet manipulation step becomes critical. Amongst the many droplet manipulation steps, droplet merging remains to be a critical bottleneck in this regard.

Second, having to process large libraries utilizing assays that require several hours of cultivation time, which is the case in many biological assays, means that the system must operate with a high efficiency for long periods of time (e.g., tens of hours to days). Many droplet microfluidic systems developed thus far, especially those that link more than a few droplet manipulation steps, typically cannot run stably for long periods of time. Limitations in such long-term stability typically stem from unstable flow (or reflow) of droplets. Differences in droplet-to-droplet distances, instability in flow speed over time, loosely packed droplets, merged droplets, and split droplets that are being re-flown, all have a direct negative impact on the efficiency of downstream droplet handling steps, such as droplet synchronization and merging.

Third, many cell-based assays require cultivation and/or incubation steps of several hours (sometimes even tens of hours), and thus to avoid nutrient limitation or to provide sufficient time for the biological assay to occur, a sufficient droplet volume is needed to maintain cell viability and/or too support cell growth. In droplet microfluidics, the smaller the droplet sizes are, the more stable the droplets are, and thus results in faster and more efficient droplet operation. As the droplet size increases to more than 50-100 micrometers in diameter, droplets become more unstable, especially when manipulating the droplets at high speeds (even when using surfactants), often resulting in unexpected droplet shearing, droplet splitting, and droplet merging. Taken together, significant improvements in various droplet manipulation steps are still needed.

Two aspects that can overcome many of the above-mentioned challenges are related to the droplet reflow and droplet merging steps. Many droplet pairing and merging techniques have been developed so far. When two droplets that are already generated must be merged one-to-one into a single droplet, pairing and synchronizing them first one-to-one before merging is the most critical step so that all droplets are merged at an exact one-to-one ratio (i.e., no unmerged droplets, or no three or more droplets merged into a single droplet).

Various pressure-equilibrating structures such as micro-pillar arrays, railroad-like microfluidic channel structures, fluidic oscillators, and pressure regulators have been employed to improve the pairing efficiency so that two trains of droplets to be merged are first paired with each other, followed by merging these two trains of droplets into a single flow stream and then finally merging them. However, droplets do not always enter such droplet pairing/synchronization region in an orderly manner, resulting in error in one-to-one droplet pairing. Other methods such as those utilizing flow differences in two different size droplets so that one droplet catches up to another droplet can increase the merging efficiency, but the efficiency still relies on how consistent the incoming droplet flow is. Importantly, this method still relies on accurate one-to-one droplet pairing, to begin with.

Another commonly used droplet pairing and merging method is the use of "pico-injection", which uses a pressurized aqueous flow channel positioned perpendicular to the droplet flow channel to inject a controlled volume of reagent directly into each droplet that is passing through the T-junction while an electric field is applied. This eliminates the need for first generating a droplet to be paired. However, this method still relies on droplets being reflowed in a very consistent manner to achieve high merging efficiency, and is prone to unwanted cross-contamination between the solution-injected droplets as content from one droplet can backflow into the pico-injection channel and then contaminate subsequent droplets. Overall, in almost all these methods, the droplet merging efficiency remains in the range of 80-95%, especially when looking at the long-term efficiency (e.g., more than few hours). Considering some of the most optimum scenarios of 95% pairing/merging efficiency, when linking two such merging schemes, the overall system efficiency drops to approximately 90%, meaning that when processing a library of 1 million cells, 100,000 droplets will potentially be false positives/false negatives.

Regardless of the method used, stable and consistent reflow of droplets are critical in maintaining high droplet pairing and merging efficiencies. However, this is non-trivial, as any sudden changes in droplet flow direction in the microfluidic system, or droplets moving from a chip to tubing and/or vice versa, or whenever there is a dead volume in the system, all can cause inconsistent droplet reflow into the droplet merging region. In these cases, variations in droplet-to-droplet distances, unwanted droplet shearing, unwanted droplet splitting, or unwanted droplet merging at interfacial junctions are often observed, resulting in low droplet pairing and merging efficiencies. Integrating all droplet functions into the same chip can minimize issues stemming from device-to-tubing interfaces, but even such a fully integrated system can still suffer from drastic changes in flow speed/direction when the droplet flow direction changes abruptly or when the droplets move through sharp corners. For example, re-flowing droplets from a densely packed vertical droplet culture reservoir into a horizontal channel requires droplets to make a sudden 90° change in flow direction while they also undergo movement from a large channel to a small channel.

In the world of droplet microfluidics, manipulation of droplets with high stability and high efficiency, especially when multi-step sequential droplet operations are involved, remains extremely challenging. Examples of common failure modes are unwanted droplet breakage and unwanted droplet merging, which contribute to low efficiencies in each droplet manipulation function. This ultimately leads to many of the droplet manipulation functions occurring at far less than 100% efficiency and with low reproducibility, leading to high false-positive and false-negative rates, as well as overall system inefficiency.

SUMMARY

Provided here are systems that can provide the means to re-flow droplets consistently so that all droplets flow into a droplet pairing/merging region at the same flow speed and with the same droplet-to-droplet distance, which is critical in achieving high-efficiency droplet pairing and merging. Obtaining ultra-high-efficiency droplet merging using large-volume droplet incubation chambers (either on-chip and off-chip) provides the foundation for the development of integrated high-efficiency functional droplet microfluidic-based assays. Disclosed herein is an integrated system with these functionalities—droplet generation, droplet reflow, droplet cleaving, droplet synchronization, and droplet merging—to obtain extremely high droplet merging efficiencies (e.g., 99.9%) that will enable highly efficient complex droplet microfluidic assays. Described here are several methods, systems, and processes to produce paired and merged droplets, and the use of these methods, systems, and processes for testing/manipulating fluidic samples.

Accordingly, in one aspect is provided a droplet production system comprising: a droplet transition unit comprising a curved or sloped structure to provide controlled flow of multi-phase emulsion droplets (such as water-in-oil emulsion droplets) to a droplet cleaving unit; a droplet cleaving unit containing two or more microfluidic channels joined at an acute angle, wherein a first continuous-phase fluid flows in a first microfluidic channel, a second fluid comprising multi-phase emulsion droplets flows in a second microfluidic channel, and wherein the continuous-phase fluid in the first microfluidic channel is cleaved into a second set of droplets by flow of the multi-phase emulsion droplets in the second microfluidic channel; a droplet-synchronization unit that places the first set of multi-phase emulsion droplets in close proximity to the second set of droplets generated from cleaving of the continuous-phase flow to form paired droplets, wherein a pairing ratio between the first set and second set of droplets varies depending on the conditions utilized; and a merging unit that merges the paired droplets into a single droplet. In some embodiments, one or more of droplet cleaving and synchronization units are connected in series to create two or more paired droplets for merging. In some embodiments, the droplet transition unit contains a curved structure fabricated using a three-dimensional microfabrication method.

In some embodiments, the paired droplets are merged using an electric field, acoustic wave, convective heating, or other droplet merging methods. One or more meandering channels or merging zones can be present and placed to allow the paired droplets to be merged at more than one location. In some embodiments, the two or more microfluidic channel layers are stacked in any spatial direction with respect to a base plane of the system.

In some embodiments, flow of the second fluid is adjusted to vary size of the multi-phase emulsion droplets, rate of flow, and spacing between the multi-phase emulsion droplets. In some embodiments, size of the second set of droplets is varied by adjusting one or more of flow of the continuous-phase fluid or the second fluid, dimensions of the first microfluidic channel, or dimensions of the second microfluidic channel. In some embodiments, various droplet pairing ratios are obtained by adjusting flow parameters of the first and second fluids. In some embodiments, the continuous-phase fluid flow contains one or more reagents, microparticles, microbeads, and/or cells.

In another aspect is provided a fluid sample testing system comprising: a droplet transition unit comprising a curved or sloped feature to provide controlled flow of a fluid sample to a droplet cleaving unit; the droplet cleaving unit containing two or more microfluidic channels joined at an acute angle, wherein a fluid sample flows in a first microfluidic channel, a first fluid containing a first set of multi-phase emulsion droplets flows in a second microfluidic channel, and wherein the fluid sample in the first microfluidic channel is cleaved into a second set of droplets by flow of the multi-phase emulsion droplets in the second microfluidic channel; a droplet synchronization unit that places the first set of multi-phase emulsion droplets from the first fluid in close proximity to the second set of droplets generated from the fluid sample by cleaving to form paired droplets, wherein a pairing ratio between the first set of droplets and second set of droplets varies depending on the conditions utilized; and a merging unit that merges the paired droplets into a single droplet. In some embodiments, the transition region is a curved structure fabricated by a microfabrication method. In some embodiments, one or more meandering channels or merging zones are present and are placed to allow the droplets to be merged at more than one location. In some embodiments, the two or more microfluidic channel layers are stacked in any spatial direction with respect to a base plane of the system.

In some embodiments, the paired droplets are merged using an electric field, acoustic wave, convective heating, or other merging methods. In some embodiments, flow of the first fluid is adjusted to vary size of the multi-phase emulsion droplets, rate of flow, and spacing between the multi-phase emulsion droplets.

In some embodiments, the size of the second set of droplets is varied by adjusting one or more of flow of the fluid sample or the first fluid, dimensions of the first microfluidic channel, or dimensions of the second microfluidic channel. In some embodiments, various droplet pairing ratios are obtained by adjusting flow parameters of the fluid sample or the first fluid or both. In some embodiments, a merged droplet contains two or more reagents, hydrogels, beads, particles, cells, or combinations thereof. In some embodiments, the fluid sample contains one or more reagents, microparticles, microbeads, cells, or combinations thereof.

BRIEF DESCRIPTION OF THE DRAWINGS

Embodiments will be readily understood by the following detailed description in conjunction with the accompanying drawings. The drawings are not necessarily to scale; emphasis instead generally being placed upon illustrating the principles of the various embodiments. Various dimensions may be altered. In certain instances, details that are not necessary for an understanding of the various aspects of the embodiments or that render other details difficult to perceive may have been omitted. It should be understood, of course, that the invention is not necessarily limited to the particular embodiments illustrated herein or specific dimensions.

FIG. 1A provides the tomography image of each layer of the device. FIG. 1B illustrates the 3D structure of the entire assembly. FIG. 1C is a top view of the 3D structure showing the device designed. FIG. 1D is a side view of the working principle of the 3D culture chamber and curved transition junction. FIG. 1E is a top view of the working principle of the cleaving and auto-synchronization junction. FIG. 1F is the working principle of the electrocoalescence zone. FIG. 1G is a perspective view of the fabricated device, where fluidic channels are filled with blue color dye and pneumatic actuation channels are filled with black color dye for easy visualization. FIG. 1H is a top view of the fabricated device with the dotted square boxes indicating the droplet transition, cleaving, and merging zones. FIG. 1I is an illustration of the overall droplet flow scheme in the device.

FIG. 2A is a top view of the droplet reflow part of the curved droplet transition junction. FIG. 2B is an image of a side cross-section view of the fabricated device showing a curved top and bottom transition junction. FIG. 2C is an image of outflow droplets from the curved transition junction with a controlled flow rate/frequency. FIG. 2D is an image of outflow droplets after being spaced by an oil inlet spacer.

FIG. 3A is a micrograph of droplets being generated in the bottom layer. FIG. 3B is a micrograph of droplets being reflowed out from the curved transition junction. FIG. 3C is a micrograph depicting the injection of oil to add spacing between reflowed droplets. FIG. 3D is a micrograph showing one-to-one droplet cleaving and pairing.

FIG. 4B is a graph showing the cleaved droplet size change due to changes in the flow rate. Dimensions are not limited solely to these geometries.

FIG. 5A) shows how different channel widths (50 μm, 60 μm, 70 μm, 80 μm, 90 μm, and 100 μm) affect the size of the cleaved droplets. FIG. 5B is a graph summarizing the droplet size change due to changes in the channel width of the continuous-phase flow channel. Dimensions are not limited solely to these geometries.

FIG. 8D is an image in the green fluorescence (GFP) channel showing the flow of GFP-*Salmonella*. FIG. 8E is an image in the DAPI channel showing the droplet pairs. FIG. 8F is an image with the electric field off, showing reflowed droplets with 1 μm beads within them, without 1 μm beads, and large cleaved droplets. FIG. 8G is an image of the merged droplets after turning on the electrical field. FIG. 8H is an image of the blank small droplets and the cleaved large droplets containing GFP-*Salmonella* before merging. FIG. 8I is an image of the merged droplets with GFP-*Salmonella*.

DETAILED DESCRIPTION

Figure 1A:
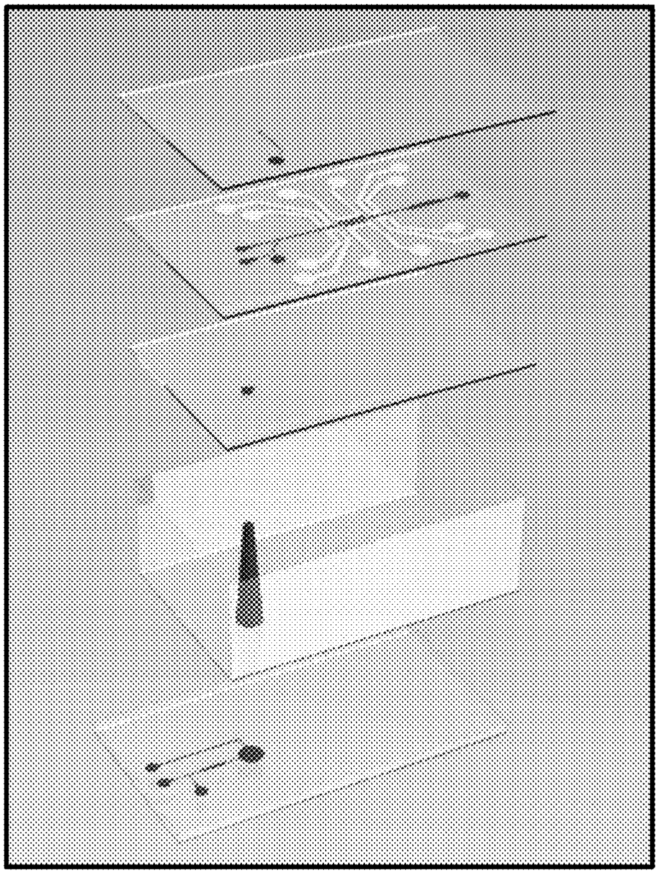
FIGS. 1A-1I provide the schematic and aspects of the fabricated device for achieving high-efficiency droplet merging utilizing a vertically curved transition for droplet reflow and an automatically synchronized droplet cleaving mechanism, as well as merging of the two droplets.

A system to enhance reflow of droplets from a large-scale culture chamber and precisely pair droplets in a one-to-one fashion can significantly improve the downstream droplet merging efficiencies and ameliorate one of the most significant challenges preventing the development of integrative droplet microfluidic platforms with high accuracy. Described herein are droplet manipulation methods, systems, and processes.

One such system involves droplet generation, a large-volume droplet cultivation chamber, controllable droplet reflow, on-the-fly droplet cleaving, auto-synchronization, and droplet coalescence all at an ultra-high efficiency. Droplets are generated on a bottom fluidic layer and introduced into a bottom-up large-volume chamber. The innate buoyance of water-based droplets in fluorinated oil allows for droplets to float and collect at the top of the chamber (an alternative top-down approach can be conceived using a different combination of oil/water/reagent phases). After filling the chamber with droplets, droplets are released in a tightly packed and ordered manner. A sloped two-photon lithography printed transition layer is integrated to allow for a smooth transition of droplets from the large culture chamber to a traditional fluidic channel. In addition, a top two-photon lithography printed channel layer is used to reduce the dead volume at the top of the chamber and prevent droplets from being stuck in the chamber. This approach provides an ideal case where droplet spacing can be adjusted as desired, leading to identical droplet reflow and spacing conditions. Coupled with a novel droplet cleaving approach, droplets can be paired one-to-one at an ultra-high efficiency. In this system, an integrated downstream three-dimensional electrode-based droplet electrocoalescence design is used to obtain a droplet pairing and merging efficiency of 99.9% (other merging methods could be integrated to achieve the same merging goal). The approach developed herein offers the ability to conduct comprehensive large-scale multi-step droplet processing at an unprecedented efficiency and entails a novel technique for efficiently pairing two (or more) droplets of varying sizes. This approach can be utilized as a ground-breaking technology for a variety of applications that require the development of complex integrated droplet microfluidic assays which have previously struggled to obtain on-chip high-efficiency functional droplet manipulation.

Provided here is a paired and merged droplet production system that contains (i) a droplet transition unit containing a curved or sloped structure to smoothly transition droplets from one area of a device to another, or from one device to another, or from a tubing to a device or vice versa, wherein droplets can be tightly packed and reflowed in a packed controlled manner without unwanted merging or rupturing of droplets; (ii) a droplet cleaving unit containing two or more microfluidic channels joined at an acute angle, wherein a first phase of an aqueous fluid flows in a first microfluidic channel, a second phase of a multi-phase droplet emulsion (e.g water-in-oil emulsion droplet) flows in a second microfluidic channel, and where the second solution stream is cleaved into droplets by the multi-phase emulsion droplet flow; (iii) a droplet synchronization unit that places the first set of multi-phase droplets in close proximity to the second set of droplets generated from the continuous-phase flow stream by cleaving, where the pairing ratio between the first and second sets of droplets can vary depending on the conditions utilized (1:1 being the basic condition, where 1:2, 2:1, 1:3, 3:1, etc. are all possible); and a merging unit that merges the paired droplets into a single droplet.

In certain embodiments, the droplet transition region is a curved shape. The curved shape is both vertically oriented in Z-Y direction as well as planar in X-Y direction (but is not limited to this orientation). The droplets can transition smoothly without being merged/sheared and remain tightly packed. The curved structures can be fabricated with three-dimensional microfabrication methods such as two-photon photolithography or various three-dimensional printing methods. The paired droplets can be merged using an electric field, acoustic wave, convective heating, or other droplet merging methods.

In certain embodiments, one or more meandering channels are placed between electrode pairs applying an electric field for droplet merging, allowing the droplets to be aligned with the electric field more than one time for maximum droplet merging efficiency (and this principle can be extended to other merging methods as well). The meandering channels may be of any shape, including but not limited to, circular, elliptical, triangular, rectangular, and so forth. In certain embodiments, the reflowed droplet size, rate, and spacing can be varied by adjusting the flow parameters. In certain embodiments, the cleaved droplet size can be varied by adjusting the flow parameters and channel dimensions. In another embodiment, various droplet pairing ratios, including but not limited to 3:1, 2:1, 1:1, 1:2, and 1:3 can be obtained by adjusting the flow parameters. Certain embodiments can include multiple droplet cleaving/auto-synchronization units that can be connected in series to create two or more paired droplets for merging. The aqueous or other fluid phase flows can contain (but are not limited to) biochemical reagents, microparticles, microbeads, and/or cells. Any combination of multi-emulsion droplets and/or (including but not limited to) reagents, microparticles, microbeads, and/or cells can be used. In certain embodiments, the two or more microfluidic channels are present as a single layer of microfluidic channels. In certain embodiments, two or more microfluidic channel layers are stacked in any spatial direction with respect to a base plane of the system.

Embodiments of the disclosure include fluid sample testing systems. One such system includes (i) a droplet transition unit comprising a curved or sloped feature to provide controlled flow of a fluid sample to a droplet cleaving unit; (ii) the droplet cleaving unit containing two or more microfluidic channels joined at an acute angle, wherein a fluid sample flows in a first microfluidic channel, a second fluid to produce a multi-phase droplet emulsion flows in a second microfluidic channel, and where the fluid sample is cleaved into droplets by the multi-phase emulsion droplet flow; (iii) a droplet synchronization unit that places the first set of multi-phase droplet emulsion droplets from the second fluid in close proximity to the second set of droplets generated from the fluid sample by cleaving, where the pairing ratio between the first set and second set of droplets varies depending on the conditions utilized; and (iv) a merging unit that merges the paired droplets into a single droplet.

Another such system includes (i) a droplet transition unit containing a curved or sloped feature to smoothly transition droplets from one area of a device to another; (ii) a droplet cleaving unit containing two or more microfluidic channels joined at an acute angle, wherein a first phase of a fluid flows in a first microfluidic channel, a second phase of a multi-phase droplet emulsion (i.e. water-in-oil emulsion droplet) flows in a second microfluidic channel, and where the first phase fluid is cleaved into droplets by the multi-phase emulsion droplet flow; (iii) a droplet auto-synchronization unit that places the first set of multi-phase emulsion droplets in close proximity to the second set of droplets generated from the continuous-phase flow by cleaving; and (iv) a merging unit that merges the paired droplets into a single droplet. The droplets can be packed and reflowed in a packed control manner without merging or rupturing of droplets. The pairing ratio between the first and second droplets can vary depending on the conditions utilized (1:1, 1:2, 2:1, 1:3, 3:1, and other ratios are all possible). In certain embodiments, the transition region is a curved shape (both vertically in Z-Y direction as well as planar in X-Y direction). The droplets can transition smoothly without being merged/sheared and remain tightly packed. The curved structures can be fabricated with microfabrication methods such as two-photon photolithography or various three-dimensional printing methods. The first set of droplets containing the first phase with the second set of droplets containing the second phase can be merged using an electric field, acoustic wave, convective heating, or other merging methods. One or more meandering channels are placed between electrode pairs applying an electric field for droplet merging, allowing the droplets to be aligned with the electric field more than one time for maximum droplet merging efficiency (and this principle can be extended to other merging methods as well). These meandering channels may be of any shape, including but not limited to, circular, elliptical, triangular, or rectangular shapes. The reflowed droplet size, rate, and spacing can be varied by adjusting the flow parameters. The cleaved droplet size can be varied by adjusting the flow parameters and channel dimensions. The various droplet pairing ratios, including but not limited to 3:1, 2:1, 1:1, 1:2, and 1:3, can be obtained by adjusting the flow parameters. Certain embodiments can include a multiple droplet cleaving/auto-synchronization unit that can be connected in series to create two or more paired droplets for merging. The continuous phase fluid can contain (but are not limited to) biochemical reagents, microparticles, microbeads, and/or cells. Any combination of multi-emulsion droplets and/or (including but not limited to) reagents, hydrogels, beads, particles, and/or cells can be used. The two or more microfluidic channels can be present as a single layer of microfluidic channels. The two or more microfluidic channel layers are stacked in any spatial direction with respect to a base plane of the system.

Figure 1B:
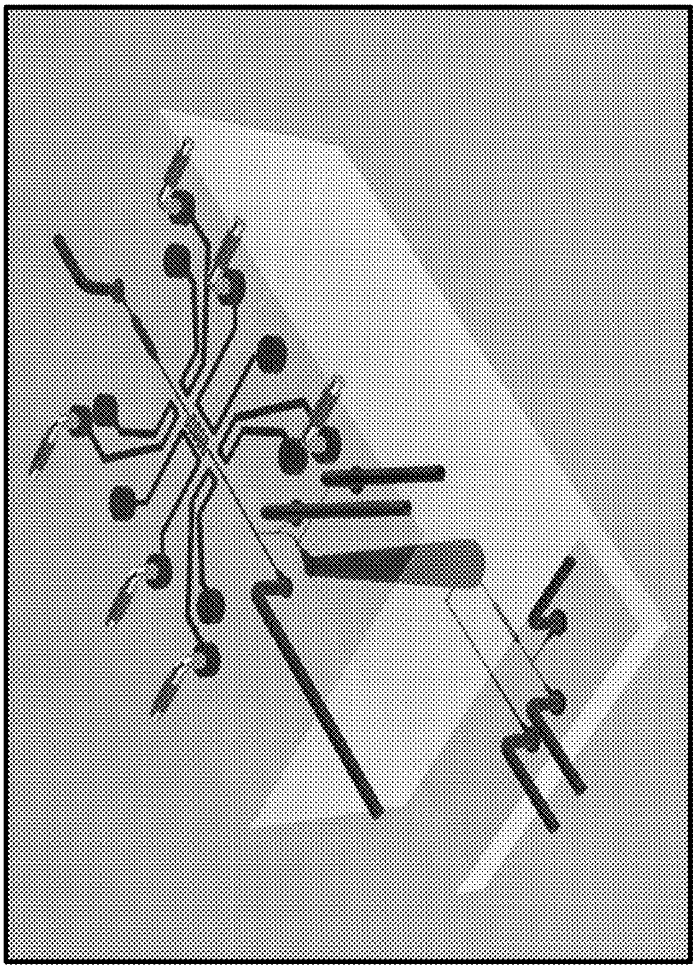
Figure 1C:
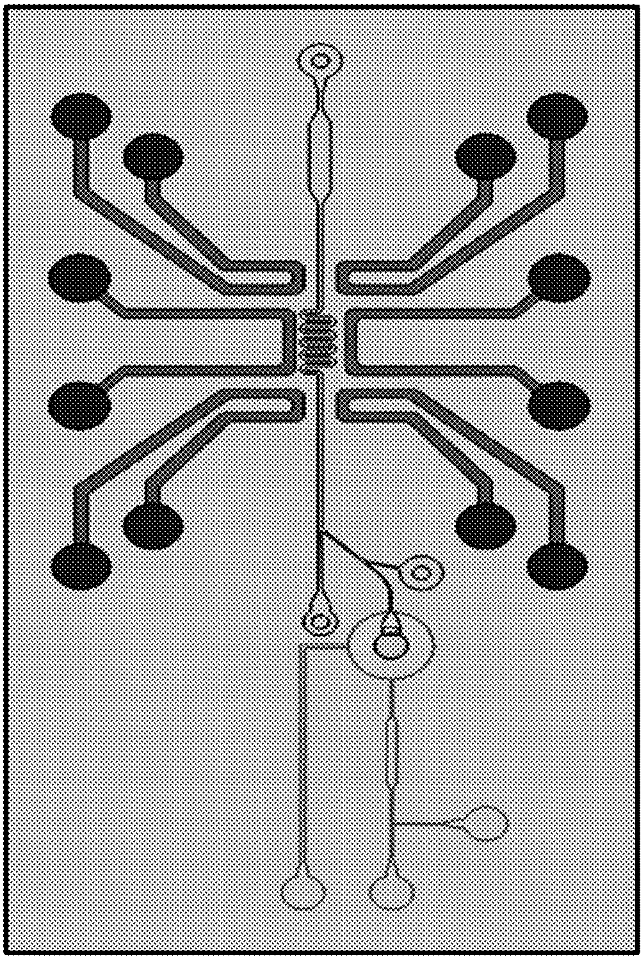
Figure 1D:
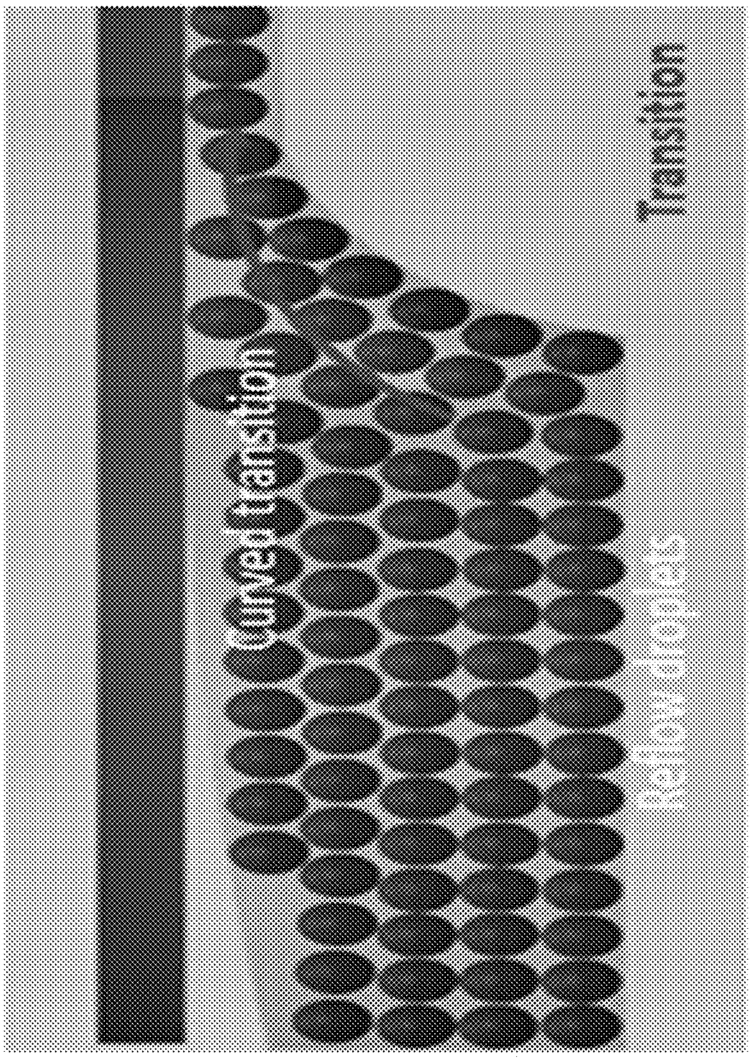
Figure 1E:
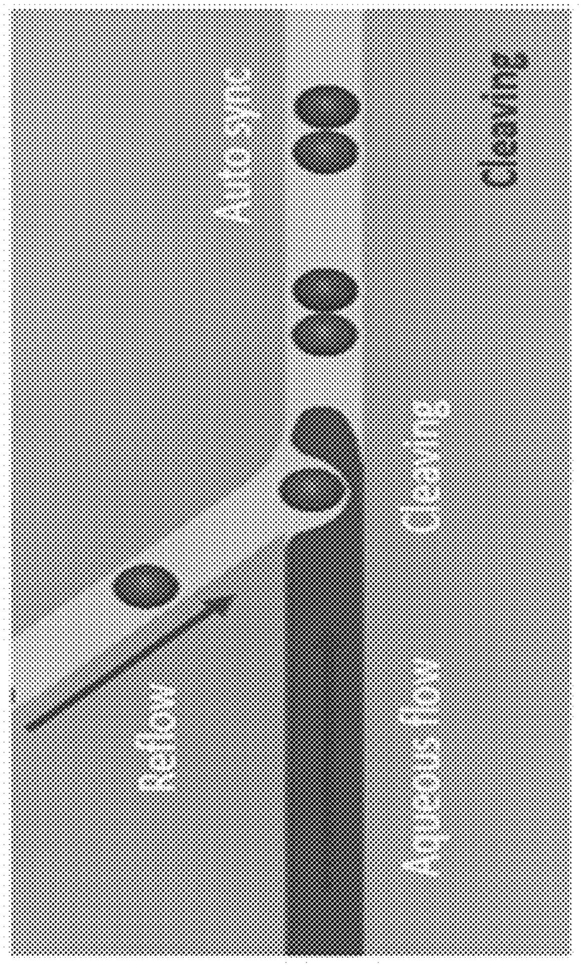
Figure 1F:
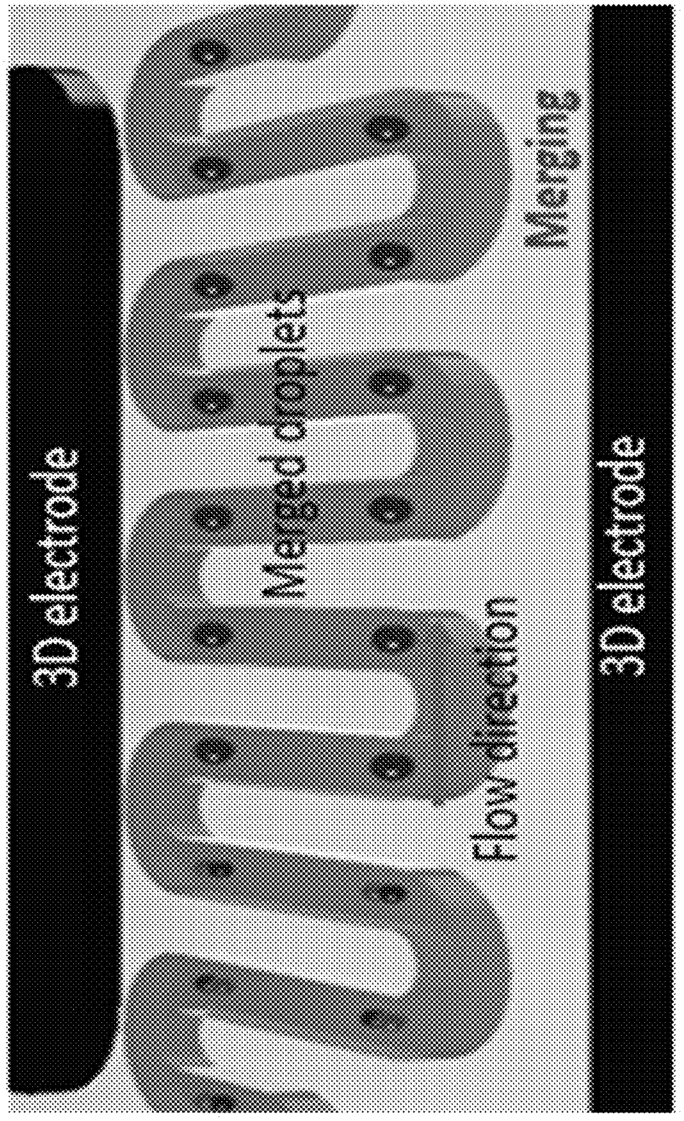
Figure 1G:
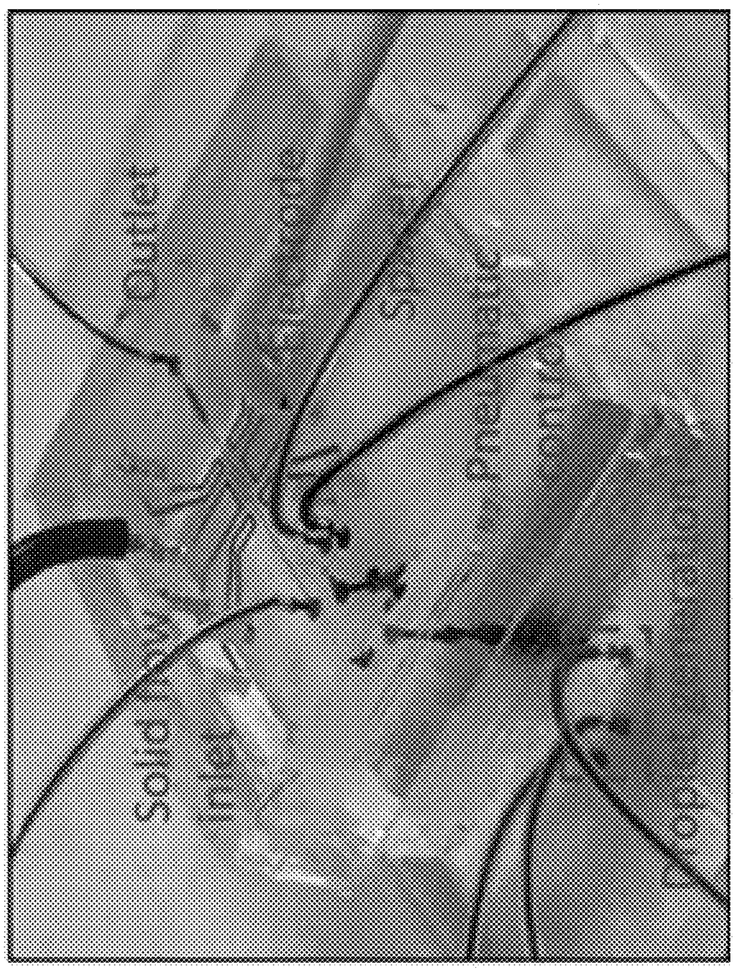
Figure 1H:
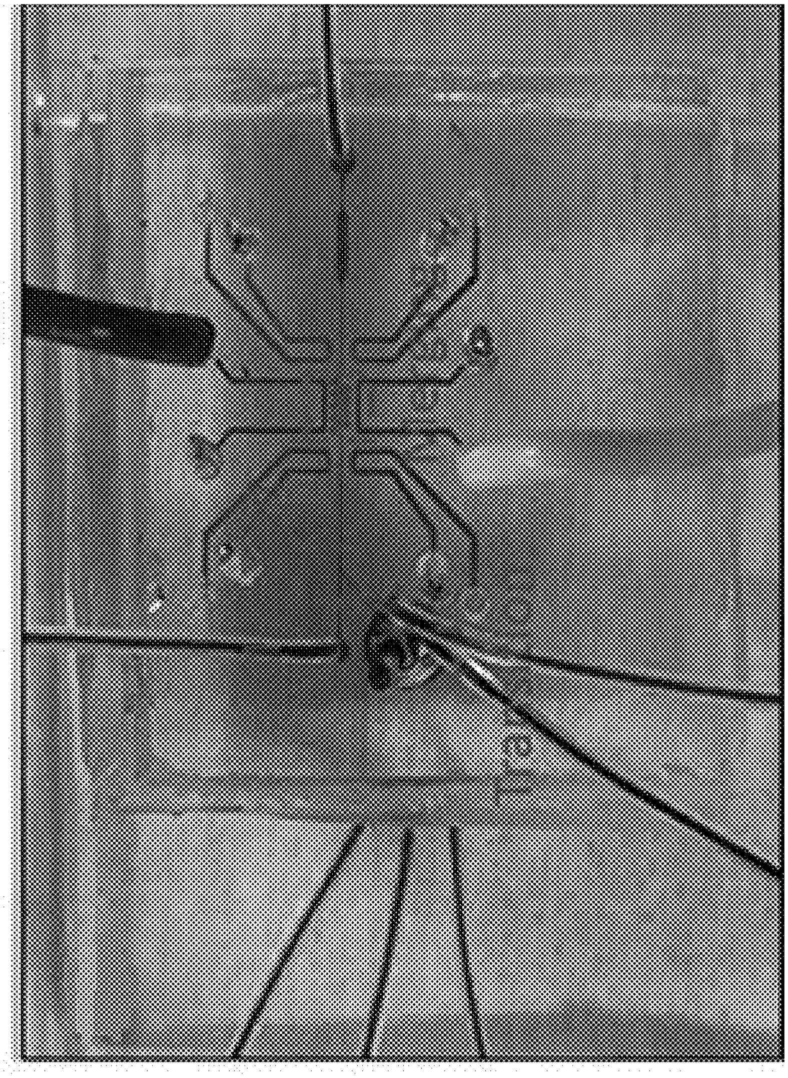
Figure 1I:
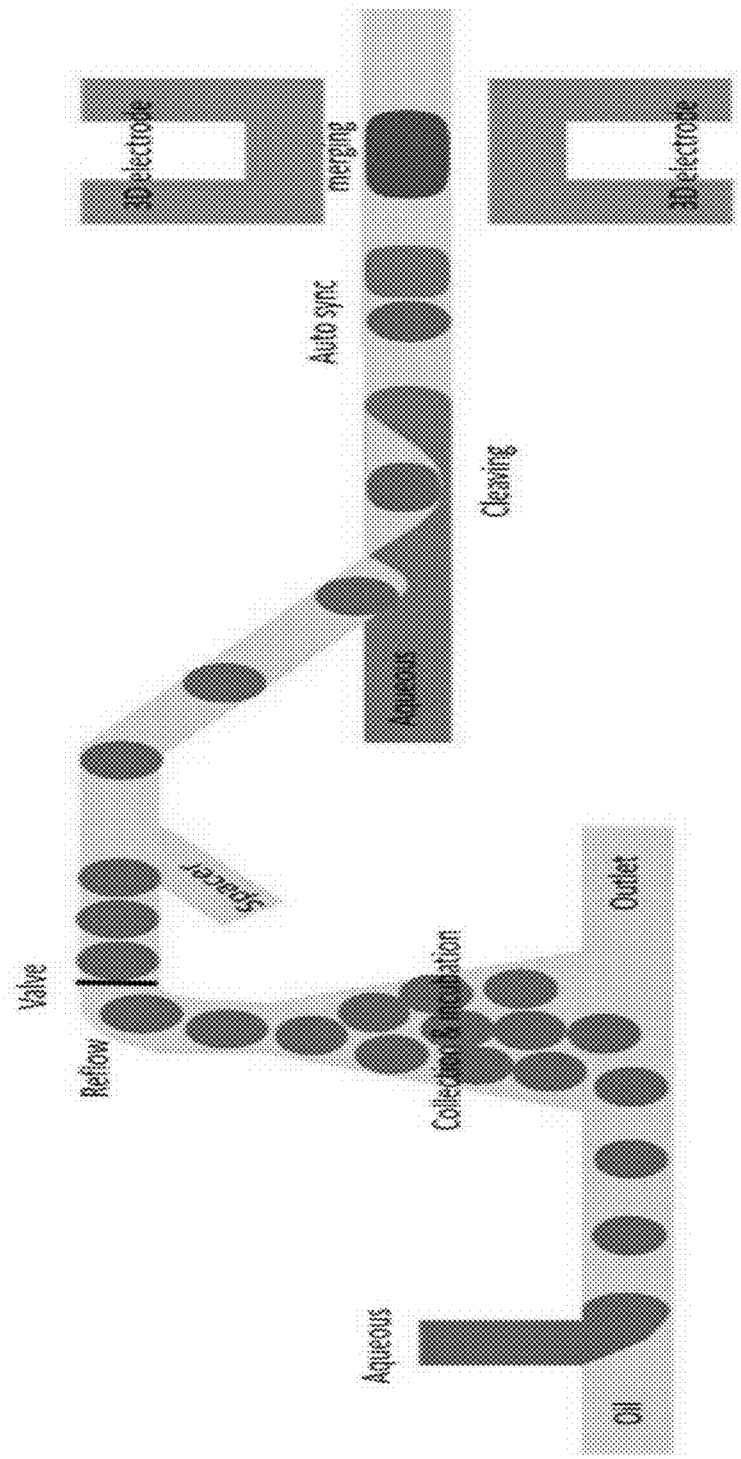

An embodiment of the apparatus, including a schematic of the device operation and fabricated device, is described in FIGS. 1A-1I. The illustrated embodiment of the device has 5 layers, but should not be construed as limited in this regard. FIG. 1A shows the tomography image of each layer of the device. From bottom to top, the heights of the channels and chambers are 50 μm, 8 mm, 200 μm, 50 μm, and 50 μm, respectively. FIG. 1B and FIG. 1C illustrate the perspective and top view of the design, respectively. The clear fields are fluidic channels and the dark fields are three-dimensional electrodes (width of 250 μm). The two working electrodes are surrounded by four shielding electrodes (width of 250 μm). The first layer is for droplet generation with a cross-section 50 μm×50 μm. Layer 2 is a through-hole chamber with an approximate volume of 0.052 ml for droplet storage and incubation (FIG. 1D). Additionally, it offers first-in-first-out droplet flow so that each droplet can experience an equal incubation time. In a specific example, but not limited to this example, the density of Novec oil (1.614 kg/L) is much larger than water, and the generated droplets float up to accumulate in the chamber (layer 2). The cone shape (bottom radius of 3 mm and top radius of 0.5 mm) of the chamber was designed to prevent an abrupt change in the droplet flow and to minimize the dead volume. After collection of droplets, the normally closed pneumatic valve on layer 5 (FIG. 1G) is actuated to open status, the collected droplets reflow through the 3D curved transitional structure (layer 3 and part of layer 4) to layer 4 by pumping oil from inlets in layer 1. The radius of the circular arc on layer 3 is 200 μm (FIG. 1F). With an acceleration by spacing oil, the reflowed droplets cut the solid flow at the cleaving junction (FIG. 1E) to form auto-paired droplets. Then, the paired droplets travel through the channel to the merging zone (FIG. 1H) and are subsequently merged in a three-dimensional electric field. The schematic of the working principle of the entire system is demonstrated in FIG. 1I. All the design characteristics and dimensions with respect to this embodiment are non-restrictive and should only be considered as an example.

An embodiment of a fabricated device is demonstrated in FIG. 1B. The device was fabricated using an integrative bonding process using multilayer polydimethylsiloxane (PDMS) soft lithography. Master molds for PDMS replication were fabricated by conventional SU-8 lithography (layer 1 and layer 5) using an EVG®610 Double-sided Mask Aligner (EV group, Austria), 3D stereolithography printing (layer 2) (Perfactory P3 Mini, EnvisionTEC), and 2-photon lithography (layer 3 and 4) using a Nanoscribe 3D Photonics Pro GT (Nanoscribe GmbH, Germany). The PDMS prepolymer and curing agent were mixed evenly at an 8:1 ratio, stirred vigorously for 5 min, poured, degassed for 30 min under dynamic vacuum, and cured at 85° C. for 2 h. The top fluidic channel layer (layer 4) was spin-coated with 2.5 g of PDMS (10:1 ratio curing agent to liquid polymer) and baked at 85° C. for 2 h. A 5 mm thick PDMS valve layer (layer 5) was replicated and bonded to the top fluidic channel layer (layer 4) using conventional methanol alignment and bonding. After 2 h baking at 85° C., the valve was actuated and bonded to the two-photon printed sloped chamber outlet (layer 3) and baked overnight at 85° C. This fabrication process results in a normally closed valving structure that can be actuated with pressure/vacuum. All layers were bonded using conventional oxygen plasma treatment at 18 W, for 120 s. The three-dimensional electrode design was fabricated by filling the microfluidic electrode channel with Roto 144F low Metal fusible Ingot Alloy (Roto Metals, CA, USA), and producing a three-dimensional electrode with no additional fabrication steps. All the design characteristics and dimensions with respect to these embodiments are non-restrictive and should only be considered as an example.

An embodiment includes a sloped microfluidic system that can be made of various polymer materials such as poly dimethyl siloxane (PDMS), thermoplastic, Silica's, PMMA, or glass. The method for obtaining a 99.9% droplet merging efficiency includes the combination of high-efficiency droplet reflow, droplet cleaving, and automatic synchronization. Integration of a multi-stacked fabrication process is used to create the system, while two sloped channel layers are used to create a smooth transition between the large culture chamber and droplet microfluidic channel layer containing droplet cleaving/synchronization functionalities. In the multi-stacked system, the fabrication process includes the use of conventional alignment marks and 3D printed 3D alignment marks to stack complex multilayer devices with high-aspect ratio structures to create functional droplet microfluidic screening systems. This method uses 3D printed, milled, or machined microfluidic layers with front and backside alignment to create a network of integrated channels for conducting complex assays. The sloped transition layers are developed using a microfabrication process called two-photon photolithography (2PP) (or other nanoscale printing technologies, such as FIB). This microfabrication technique uses a direct laser writing method, which takes advantage of two near-IR photons to induce polymerization of photosensitive material. Femtosecond laser scanning results in a 3D volume being affected whose features can be in the range of a few tens of nanometers to a few hundreds of nanometers. This allows for the production of sloped features for complex microfluidic functionalities.

Figure 2A:
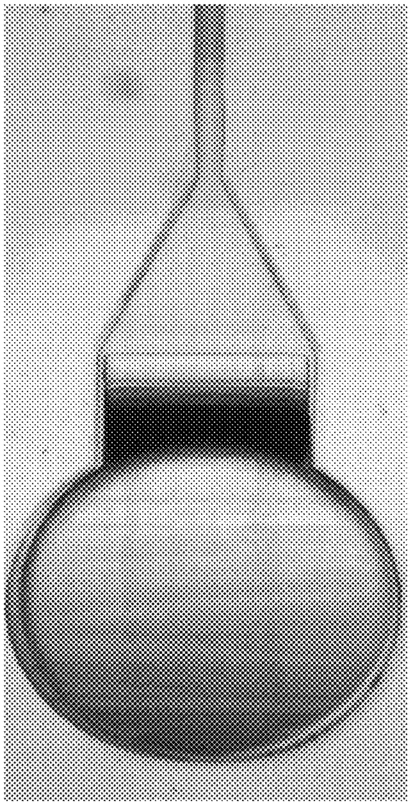
FIGS. 2A-2D is a series of images showing a curved droplet transition junction.
Figure 2B:
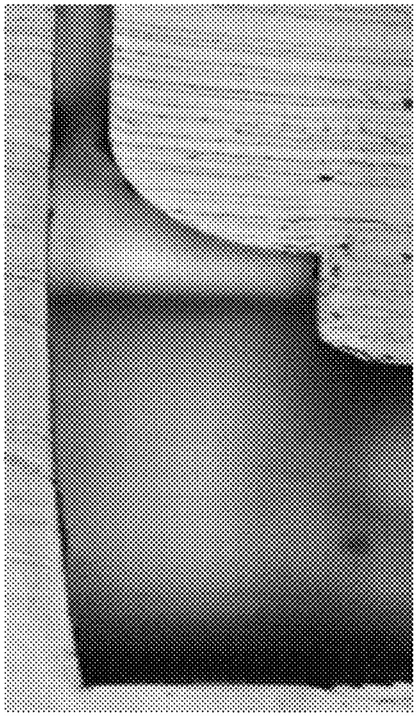
Figure 2C:
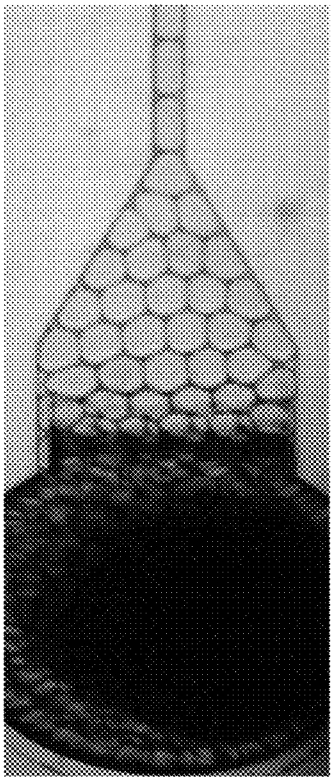
Figure 2D:
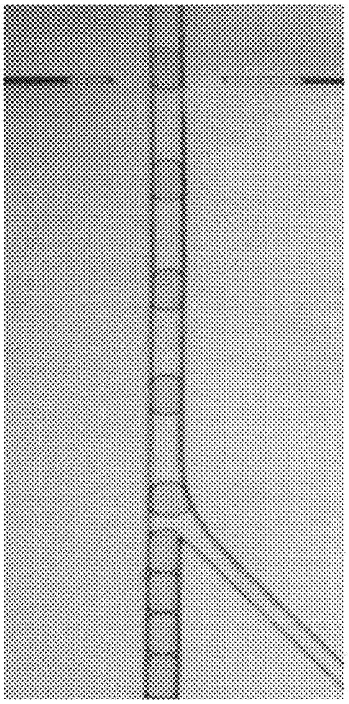

In an embodiment, the curved 2PP transition junction consists of two layers and the dimensions are 50 μm for the top channel and 200 μm for the bottom channel (FIGS. 2A and 2B). Approximately 60 m diameter droplets were generated using a T-junction droplet generator (cross-section 50 m×50 m) at 500 μl/h for the oil phase and 100 l/h for the aqueous phase. The droplets are stocked in a conical shape chamber (FIG. 2C) for reflow. Oil is injected from the bottom inlet and droplets flow through the transition junction to the top layer (FIGS. 2A-2C) and are separated by an inlet oil spacer (FIG. 2D). The reflow flow rate is controlled at 20 μl/h to generate around 20 droplets per second. The flow rate for spacing is set to 50 μl/h. All the design characteristics, dimensions, and flow rates with respect to these embodiments are non-limiting and should only be considered as examples.

Figure 3B:
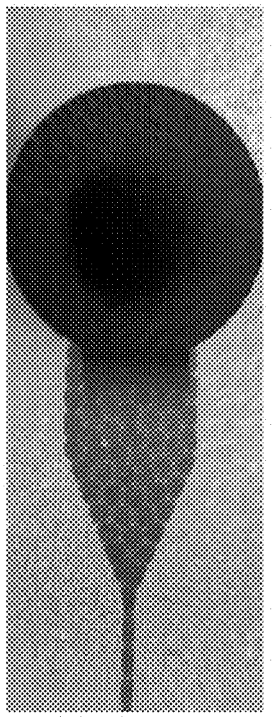
FIGS. 3A-3D are micrographs showing high-efficiency one-to-one droplet pairing using the on-the-fly auto-synchronizing droplet cleaving function.
Figure 3D:
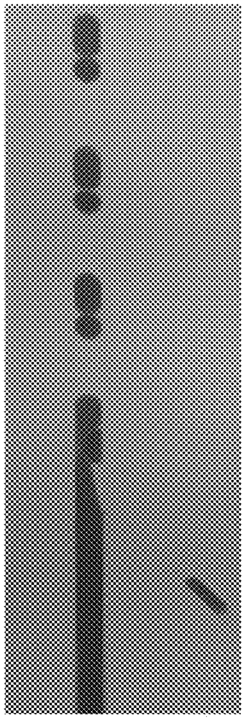
Figure 3A:
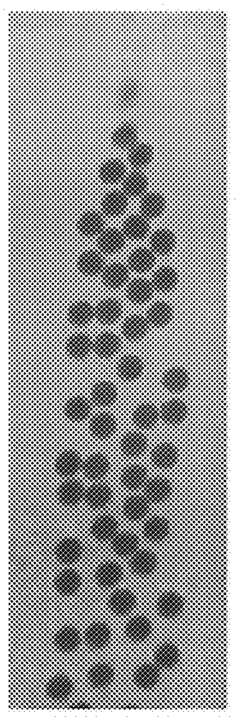
Figure 3C:
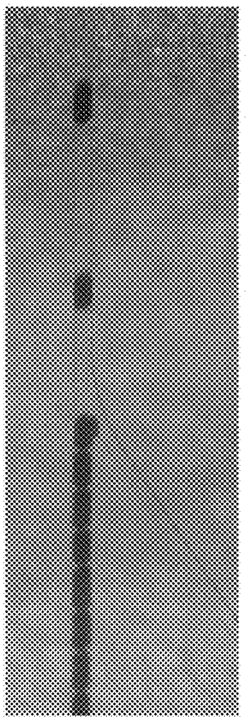

In an embodiment (FIGS. 3A-3D), generated droplets (FIG. 3A) are reflowed from the cone chamber to physically cleave a secondary continuous aqueous stream at a shallow angled Y-junction, droplets can be auto-paired one-to-one at an ultra-high efficiency. A valve structure positioned at the top of this chamber is closed to allow the droplets to become highly packed in the culture chamber, while a bottom open valve allows for excess oil to escape freely. The width of the reflow channel and continuous aqueous channel are designed to be 50 μm and 100 μm, respectively. The channel height was 50 μm. The initial flow rates for reflow, spacing, and the continuous aqueous stream are set to 15-20 μl/h, 55-60 μl/h and 30-35 μl/h, respectively. The throughput can be adjusted willingly by proportionally increases the flow rates above. Approximately, 120 Volts were applied for merging. Droplet pairing is the most crucial step that affects the final merging efficiency. In this embodiment, a stream of inflow droplets is used to cleave a solid flow and form auto-paired droplets. After passing through the 2PP transition junction (FIG. 3B), oil spacing is added to separate the droplets. A higher flow rate of the spacer oil flow leads to a large spacing interval and higher droplet flow speed, as well as higher energy for cleaving. Micrographs show the reflow droplets before (FIG. 3B) and after adding oil spacing (FIG. 3C) as well as the one-to-one droplet cleaving and auto-synchronizing system (FIG. 3D). The blue droplet physically cleaves the gray continuous-phase flow and forms paired droplets. An embodiment of a method includes a stream of water-in-oil emulsion droplets (suspended in oil) flowing into an aqueous flow at an angle that cleaves the aqueous flow into secondary water-in-oil emulsion droplets by the oil flow, which results in this second droplets to be automatically synchronized with the first water-in-oil droplets at a very high one-to-one droplet synchronization efficiency (99.9% or higher). Because the oil phase surrounding a droplet (droplet A) flowing into the main aqueous flow channel cleaves this main flow and generates a droplet (droplet B), the two droplets are automatically paired and synchronized. This eliminates the need for a separate droplet synchronization step, which leads to low efficiency in droplet pairing. Also, since the oil surrounding droplet A is the carrier flow that cleaves the main flow and generates droplet B, these two droplets are naturally very close in proximity (or even direct contact), and thus also do not require an extra step to get these two droplets close together for the two droplets to be merged into a single droplet (other phase combinations can be used to create similar pairing combinations). All the design characteristics, dimensions, and flow rates with respect to these embodiments are non-limiting and should only be considered as examples.

Figure 4A:
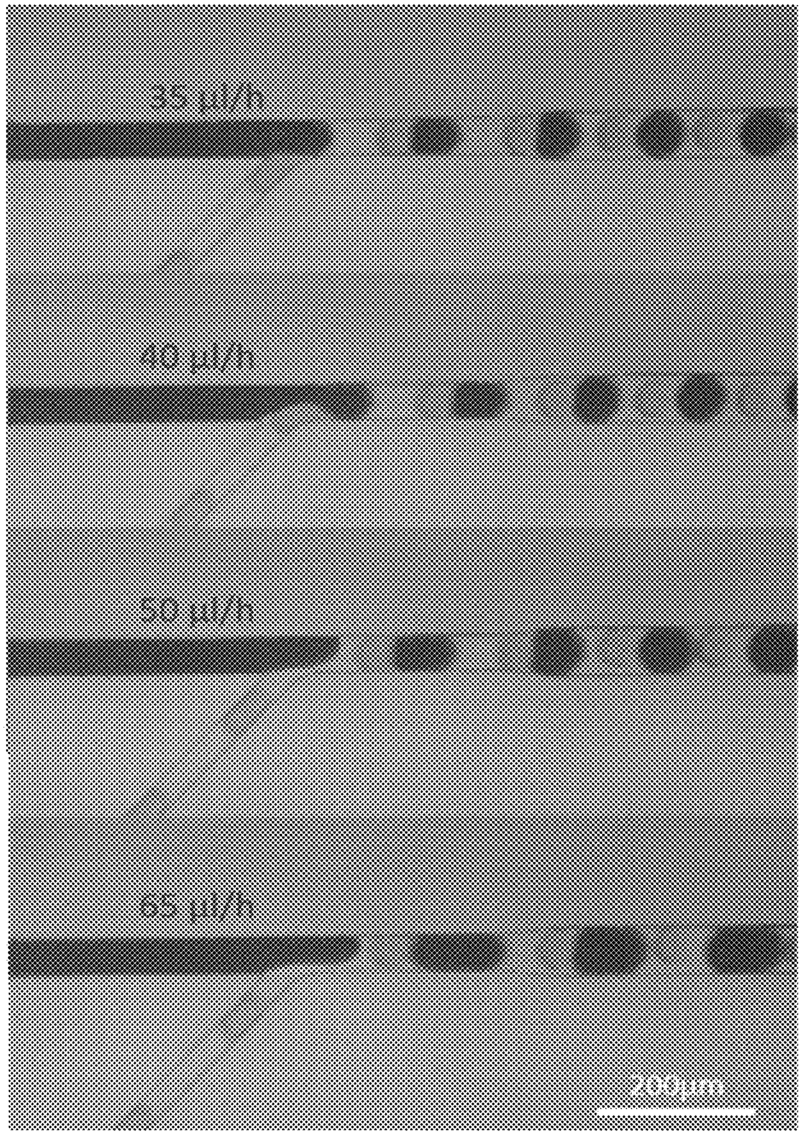
FIGS. 4A and 4B demonstrate the effects of changes to the flow speed on the size of cleaved droplets using the auto-synchronizing droplet cleaving system. The initial speeds were set to 35 μl/h (continuous flow) and 80 μl/h (reflow) for one-to-one same-size droplet cleaving (FIG. 4A). The speed was then increased to 40 μl/h, 50 μl/h, and 65 μl/h (continuous flow) for demonstration of different size droplet cleaving.
Figure 4B:
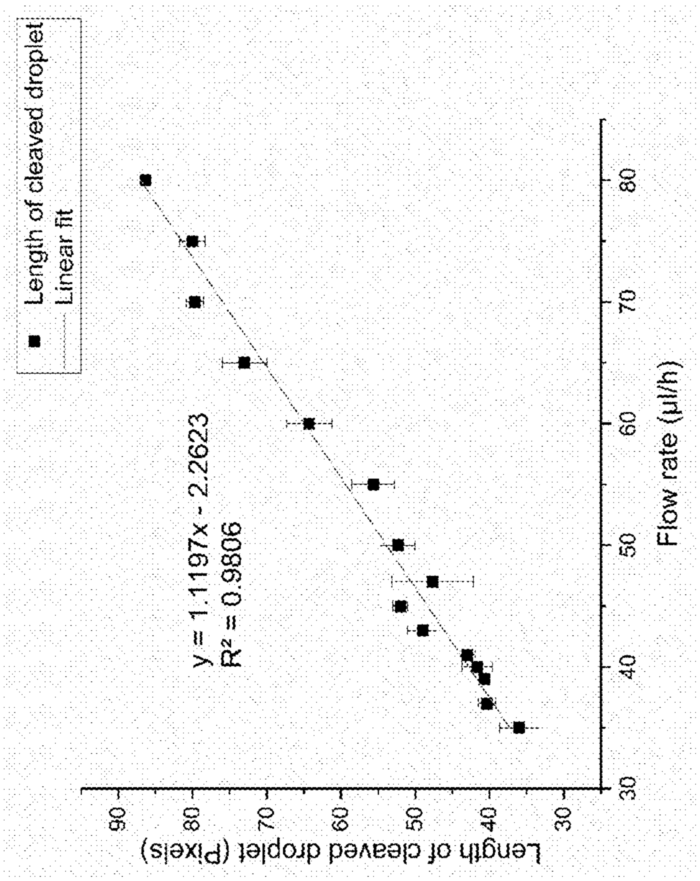

In certain embodiments, differences in the droplet reflow rate, spacing oil flow rate, continuous-phase flow rate, and droplet size (as well as ratios between these four), lead to a wide range of scenarios for achieving ultra-high efficiency pairing. FIG. 4A shows the effects of changing the aqueous phase flow speed or channel width on the size of the resulting cleaved droplets. The initial flow speeds were set to 20 μl/h (droplet reflow), 60 μl/h (oil spacing), and 35 μl/h (aqueous phase flow). The cleaved droplet size (i.e., droplet volume) can be easily adjusted as desired by controlling the droplet reflow speed, droplet spacing oil flow rate, aqueous flow rate, and aqueous flow channel width. The aqueous flow rate and cleaved droplet size are shown to be linearly correlated (FIG. 4B, $R^2$=0.98). Minimal characterization is needed when having to change the droplet size. In conventional droplet-to-droplet synchronization schemes, extensive characterization of conditions must be conducted to have a high droplet synchronization efficiency, and thus a high droplet merging efficiency. As droplets are automatically synchronized in the systems described herein, a minimum level of characterization is required to obtain optimized operating conditions, making this a very versatile method with minimal time and effort investment. Many biological or chemical assays require several different dilutions to be tested, which can be achieved using the methods described herein. All the flow rates with respect to these embodiments are non-limiting and should only be considered as examples.

Figure 5A:
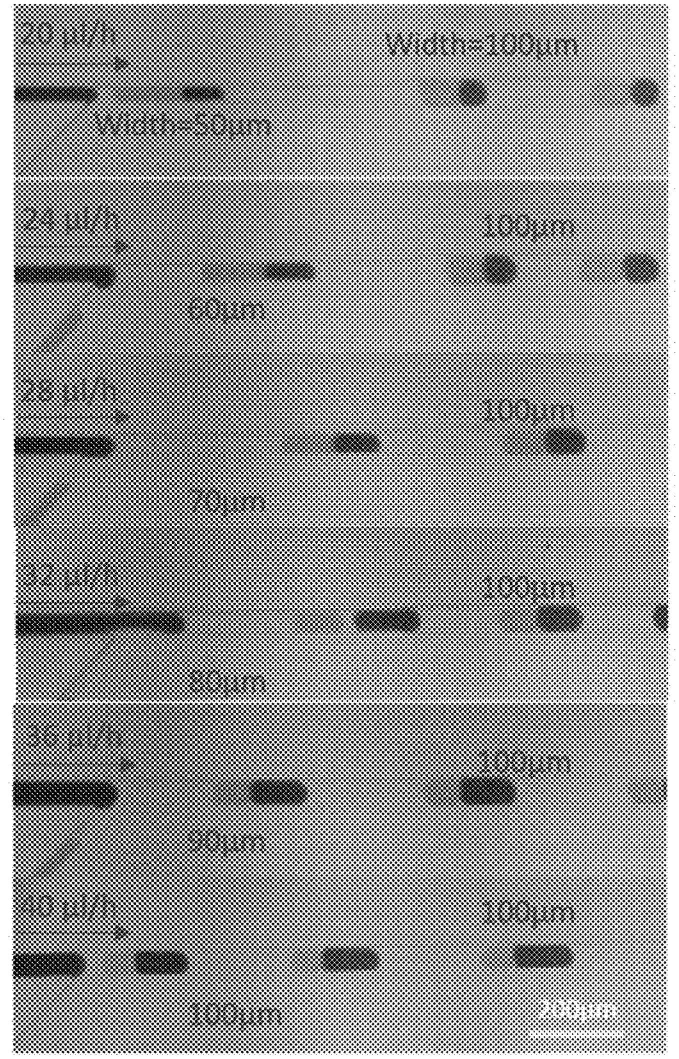
FIGS. 5A and 5B demonstrate the effects of changes to the channel width on the size of the cleaved droplets using the auto-synchronizing droplet cleaving system.
Figure 5B:
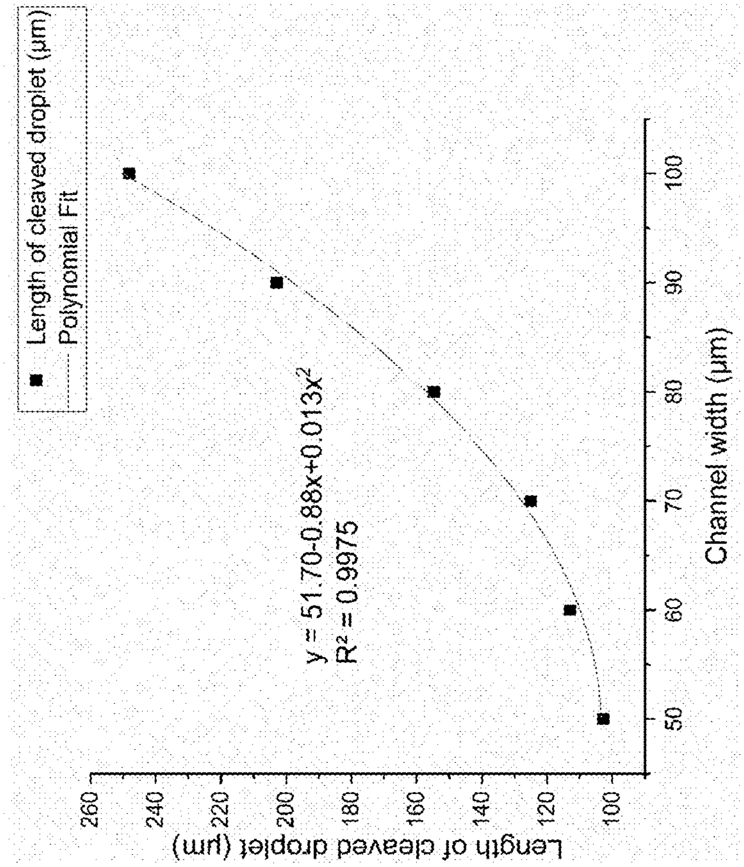

In certain embodiments, differences in the channel widths (as well as ratios between all other parameters), lead to a larger range of attainable scenarios for which ultra-high efficiency pairing can be achieved. In the example embodiment, if the flow speed remains the same and the aqueous channel width is varied from 50 μm to 100 μm (FIG. 5A), the cleaved droplet size increases non-linearly and the two variables fit a polynomial model (FIG. 5B). This case leads to a range of droplet sizes and ratios that can be created, and in combination with the adjustability of other parameters leads to an extensively large range of conditions which experience high efficiency pairing. All the design characteristics, dimensions, and flow rates with respect to these embodiments are non-limiting and should only be considered as examples.

Figure 6B:
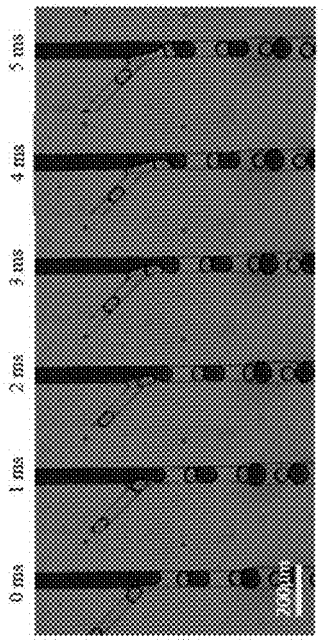
FIGS. 6A-6C are frame-by-frame micrograph images of droplet cleaving events at different throughputs: 13 droplets/sec (FIG. 6A), 142 droplets/sec (FIG. 6B), and 1182 droplets/sec (FIG. 6C), respectively using the auto-synchronizing droplet cleaving system.
Figure 6C:
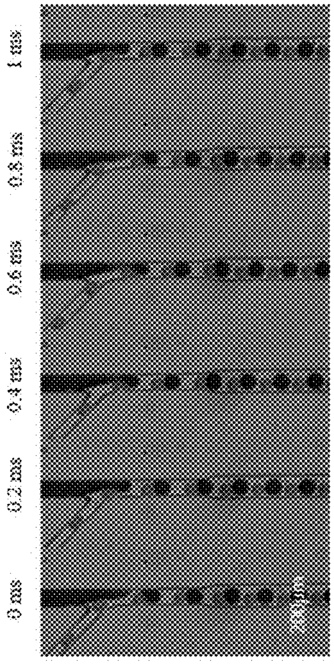
Figure 6A:
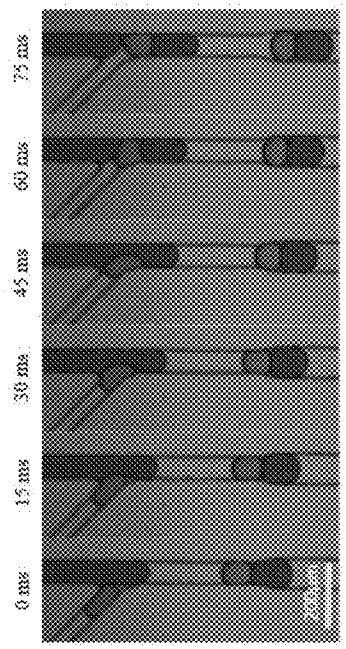

In an embodiment, droplet cleaving tests under different throughputs (from low to high: 13 droplets/second, 142 droplets/second, and 1182 droplets/second) were conducted. Frame-by-frame micrograph images showing the entire process of cleaving are illustrated in FIGS. 6A-6C. FIGS. 6A-6C are frame-by-frame micrograph images of droplet cleaving events at different throughputs: 13 droplets/sec (FIG. 6A), 142 droplets/sec (FIG. 6B), and 1182 droplets/sec (FIG. 6C), respectively using the auto-synchronizing droplet cleaving system. All the flow speed characteristics with respect to these embodiments are non-limiting and should only be considered as examples.

The cleaving and pairing efficiency is 98.5%, 100%, and 100% (n=300), respectively. The cases including missed pairs or incorrect ratio pairs are both counted as a failed pairing instance. These proof-of-concept indications provide evidence that the curved transition junction coupled with the cleaving and auto-synchronization system is capable of high-efficiency pairing and merging for low or high flow rates, including throughput ranges from 10 to $1\times10^3$ (and is expected to include a broader range of higher end throughputs).

Figure 7A:
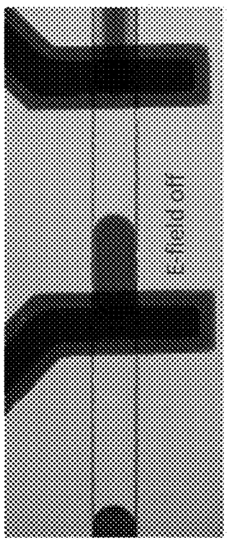
FIGS. 7A-7F are micrographs of paired droplets in the merging zones (FIGS. 7A-7B for planar electrodes and FIGS. 7C-7D for three-dimensional electrodes) and the corresponding downstream channel (FIGS. 7E-7F). Micrograph images when the droplet merging electric field was "on" (FIGS. 7A, 7C, and 7E) and "off" (FIGS. 7B, 7D, and 7F) demonstrate the droplet merging capability.
Figure 7B:
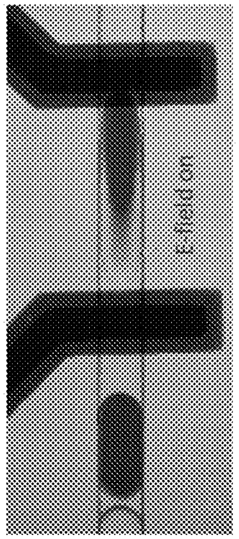
Figure 7C:
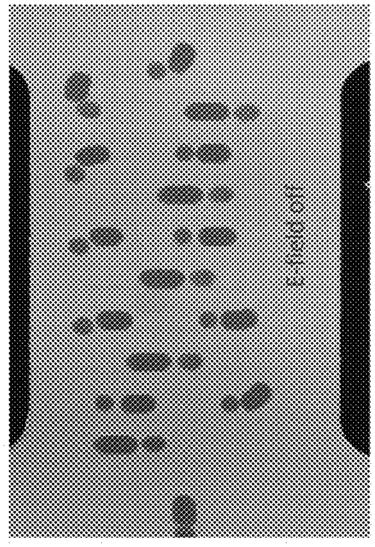
Figure 7D:
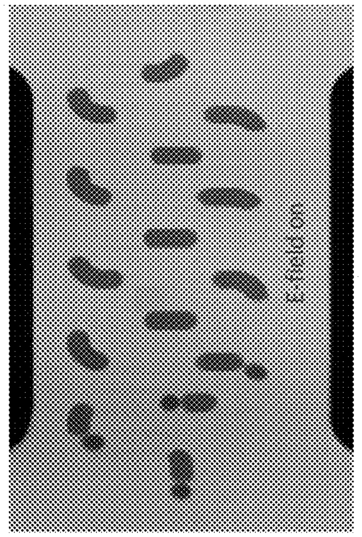

In this embodiment, paired droplets are delivered to the merging zone and then merging under an electrical field. The three-dimensional electrodes used here provide more uniform and stronger electrical field while supplying lower voltages when compared with conventional two-dimensional electrodes. FIGS. 7A-7D demonstrates the paired droplets in the merging zone before and after the electrical field is turned on. A clear merging instance using planar electrodes is observed in FIGS. 7A-7B at the merging zone. Similarly, merging using a three-dimensional electrode is shown in FIGS. 7C-7D. The resulting droplets after the merging region are observed in a downstream channel, shown in FIGS. 7E-7F.

Figure 7F:
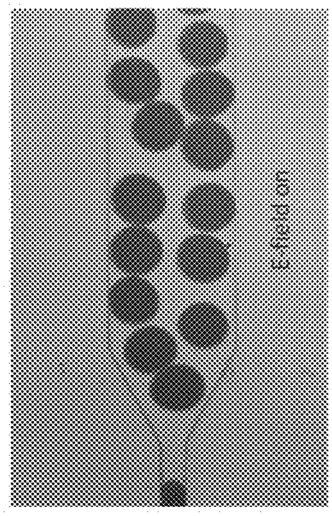
Figure 7E:
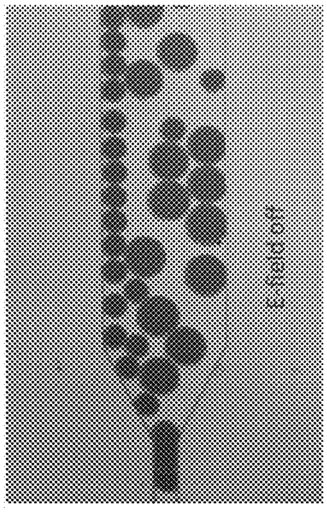

FIGS. 7A-7F are micrographs of paired droplets in the merging zones (FIGS. 7A-7B for planar electrodes and FIGS. 7C-7D for three-dimensional electrodes) and the corresponding downstream channel (FIGS. 7E-7F). Micrograph images when the droplet merging electric field was "on" (FIGS. 7A, 7C, and 7E) and "off" (FIGS. 7B, 7D, and 7F) demonstrate the droplet merging capability.

A 120 Volts and 20 kHz sine wave was applied for generating the electrical field and merging. With moderate voltage and enough spacing provided, the efficiency of merging is highly dependent on the quality of reflow and pairing. The final merging efficiency of 99% at a throughput of 4 droplets/seconds (300 droplets counted) and 99.9% at a throughput of approximately 200 droplets/seconds (1000 droplets counted) was demonstrated. Using the methods and systems described here, a droplet merging efficiency of 99.9% was achieved. In certain embodiments, the droplet diameter ranges from 55 to 60 μm at a flow rate of 10 μl/hr for droplet reflow, 70 μl/hr for droplet spacing, and 30 μl/hr for droplet B aqueous stream. Other flow rates and droplet diameters are expected to be attainable and function under the same principles.

In certain embodiments, the droplet manipulation step includes a droplet merging step, where two or more droplets are merged to form a single droplet. Two droplets are merged into a single droplet as an example, even though the methods and systems described herein can be applied for merging three or more droplets (or multi-emulsion droplets) into a single droplet as well. Successful droplet merging requires two steps: (1) two different droplets to be merged (named "Droplet A" and "Droplet B" here) need to be synchronized one-to-one, so that only those two droplets are merged; (2) these two droplets have to be in direct contact with each other, or extremely close to each other, for them to be merged using various well-known droplet merging methods such as electrocoalescence (i.e., use of electric field to merge two droplets into a single combined droplet).

An embodiment of a system includes a novel droplet-based microfluidic platform for high-efficiency reflow, pairing, and merging. A curved two-photon lithography printed transition layer was integrated to allow for a smooth transition of droplets. The novel cleaving approach where the reflowed droplet physically cleaves a secondary continuous aqueous stream at a shallow angled Y-junction to form up an auto-paired droplet at an ultra-high efficiency. The design when integrated with conventional downstream three-dimensional electrode-based droplet electrocoalescence results in a final merging efficiency that can be as high as 99.9%.

Figure 8A:
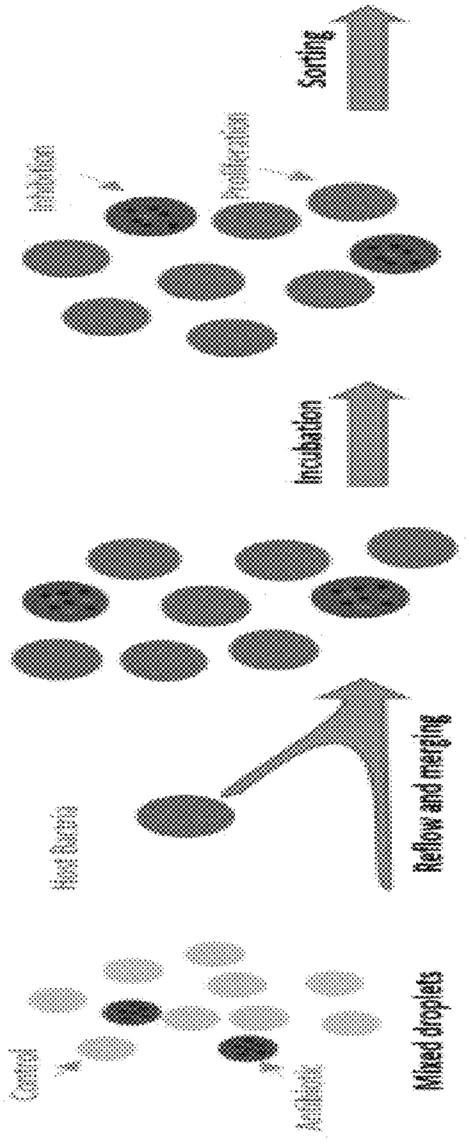
FIG. 8A is a schematic workflow to demonstrate a mock antibiotic drug screening application using the high efficiency and high throughput droplet microfluidic platform, where a mixture of antibiotic-filled droplets and empty droplets were utilized as a mock screening library.
Figure 8B:
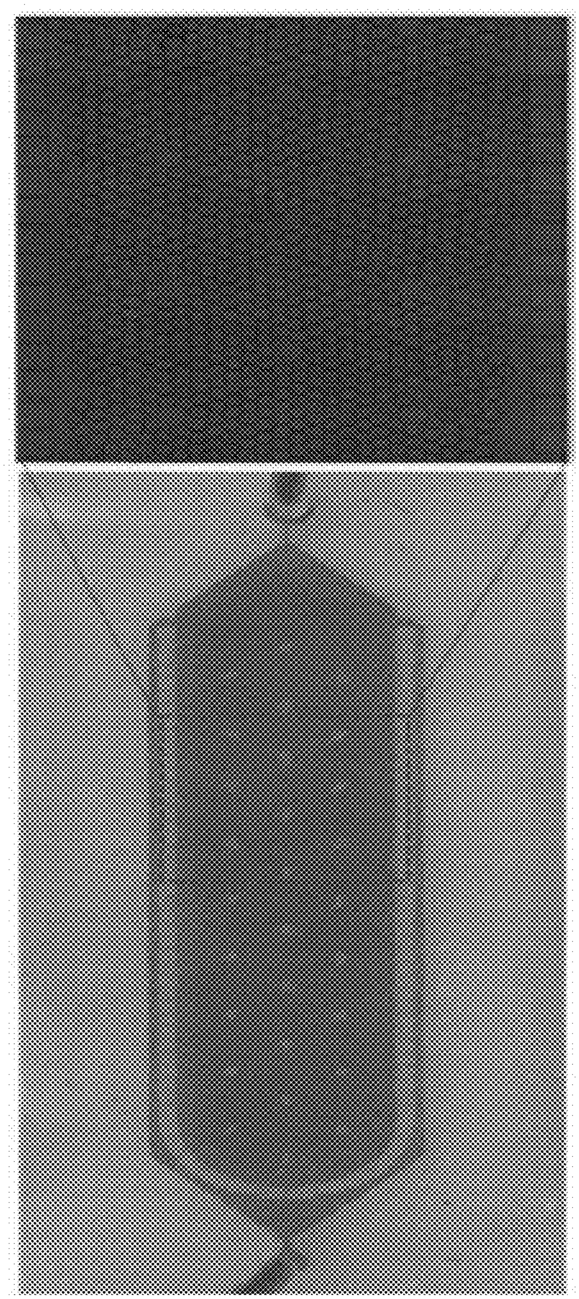
FIG. 8B is a picture of the pillar-based basket trapping droplet incubation chamber for monolayer droplet observation. The device is filled with blue color dye (left), and the bright field image shows a packed monolayer droplet basket trapping chamber (right).
Figure 8C:
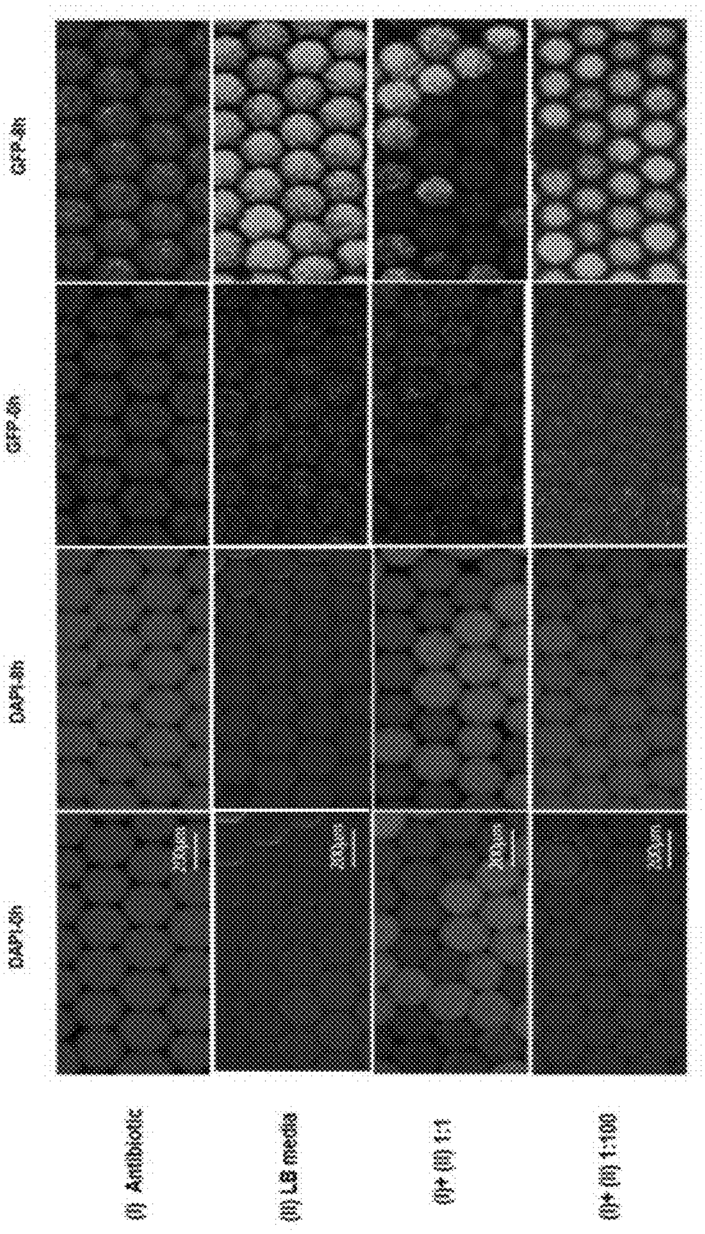
FIG. 8C is a set of micrographs showing merged droplets in the basket trapping chamber with an antibiotic-containing droplet to empty droplet mixing ratio of 1:1 and 1:100 before and after cultivation. Higher brightness droplets in the blue fluorescence (DAPI) channel indicate droplets containing gentamicin (1 mg/mL).

Another embodiment of the methods disclosed here includes a method for antibiotic drug screening (and other droplet microfluidic screening assays). The detailed outcome of the reflow, cleaving, and merging using this novel high-efficiency platform are shown in FIGS. 8A-8I. FIG. 8A is a schematic workflow to demonstrate a mock antibiotic drug screening application using the high efficiency and high throughput droplet microfluidic platform, where a mixture of antibiotic-filled droplets and empty droplets were utilized as a mock screening library. FIG. 8B is a picture of the pillar-based basket trapping droplet incubation chamber for monolayer droplet observation. The device is filled with blue color dye (left), and the bright field image shows a packed monolayer droplet basket trapping chamber (right). FIG. 8C is a set of micrographs showing merged droplets in the basket trapping chamber with an antibiotic-containing droplet to empty droplet mixing ratio of 1:1 and 1:100 before and after cultivation. Higher brightness droplets in the blue fluorescence (DAPI) channel indicate droplets containing gentamicin (1 mg/mL). The resulting merged droplets were collected and cultured in a basket trapping chamber for incubation and monolayer droplet observation (FIG. 8B), providing a method for validation of the reflow/cleaving/merging function. Bacteria time-lapse imaging was conducted for 8 hours to mimic a screening co-cultivation step and quantify the reflow/cleaving/merging efficiency. The bacteria grew to confluence in the control condition and the GFP fluorescence from *Salmonella* was significantly enhanced in every droplet of the control condition. Conversely, the growth of bacteria was inhibited in the treatment condition and no visible GFP signal was observed (FIG. 8C). The overall system-level efficiency achieved using the integrated droplet microfluidics platform was 99.9% (less than 0.1% error rate in droplet operation). In a scenario where a library contains 1 million droplets and contains 10 hits (e.g., droplets with antibiotic), the probability of missing any of the hits using a system with an efficiency of 99.9% would be 1%. In contrast, if the system efficiency is 99%, the chance of missing any one hit would be 9.6%, and if the system efficiency is 90.0%, the chance of missing any one hit would be 65.1%.

Figure 8D:
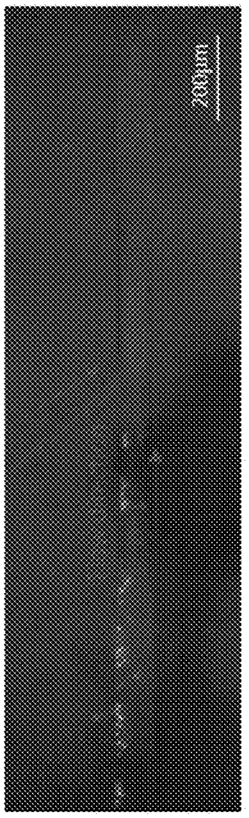
FIGS. 8D-8I are micrograph images depicting droplet cleaving and merging using GFP-*Salmonella* as target cells and droplets containing DAPI fluorescent beads with 1 mg/mL gentamicin.
Figure 8E:
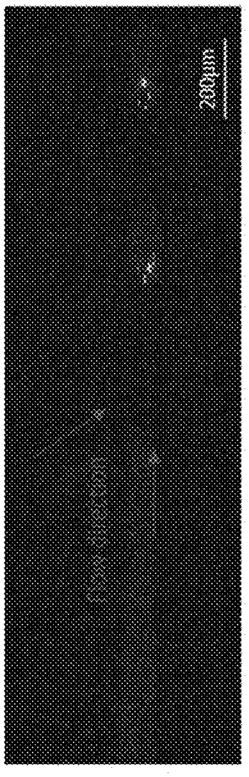
Figure 8F:
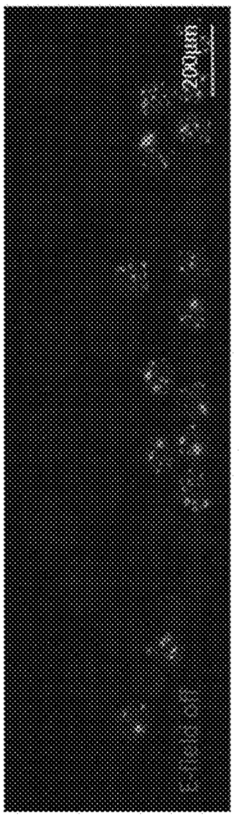
Figure 8G:
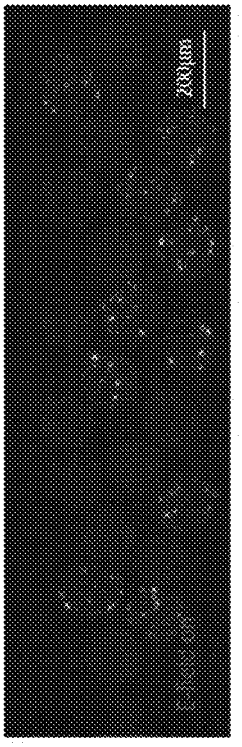
Figure 8I:
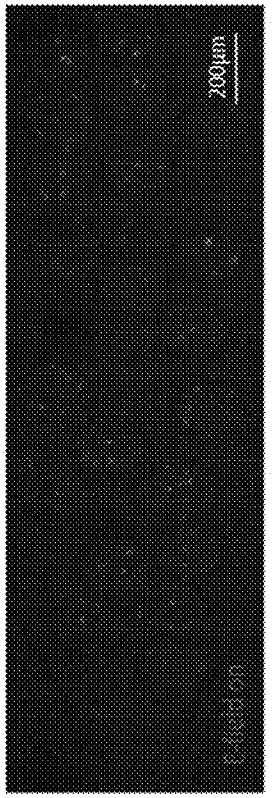
Figure 8H:
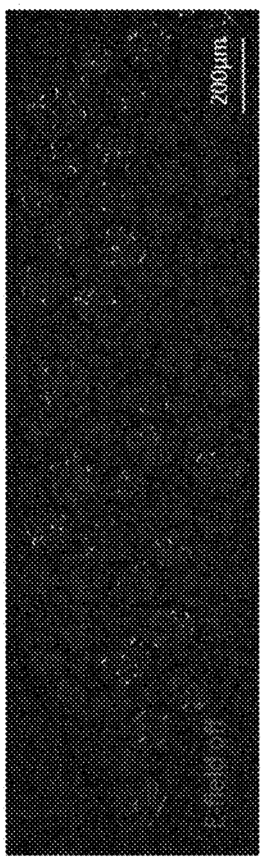

FIGS. 8D-81 are micrograph images depicting droplet cleaving and merging using GFP-*Salmonella* as target cells and droplets containing DAPI fluorescent beads with 1 mg/mL gentamicin. FIG. 8D is an image in the green fluorescence (GFP) channel showing the flow of GFP-*Salmonella*. FIG. 8E is an image in the DAPI channel showing the droplet pairs. FIG. 8F is an image with the electric field off, showing reflowed droplets with 1 μm beads within them, without 1 μm beads, and large cleaved droplets. FIG. 8G is an image of the merged droplets after turning on the electrical field. FIG. 8H is an image of the blank small droplets and the cleaved large droplets containing GFP-*Salmonella* before merging. FIG. 8I is an image of the merged droplets with GFP-*Salmonella*.

Figure 9:
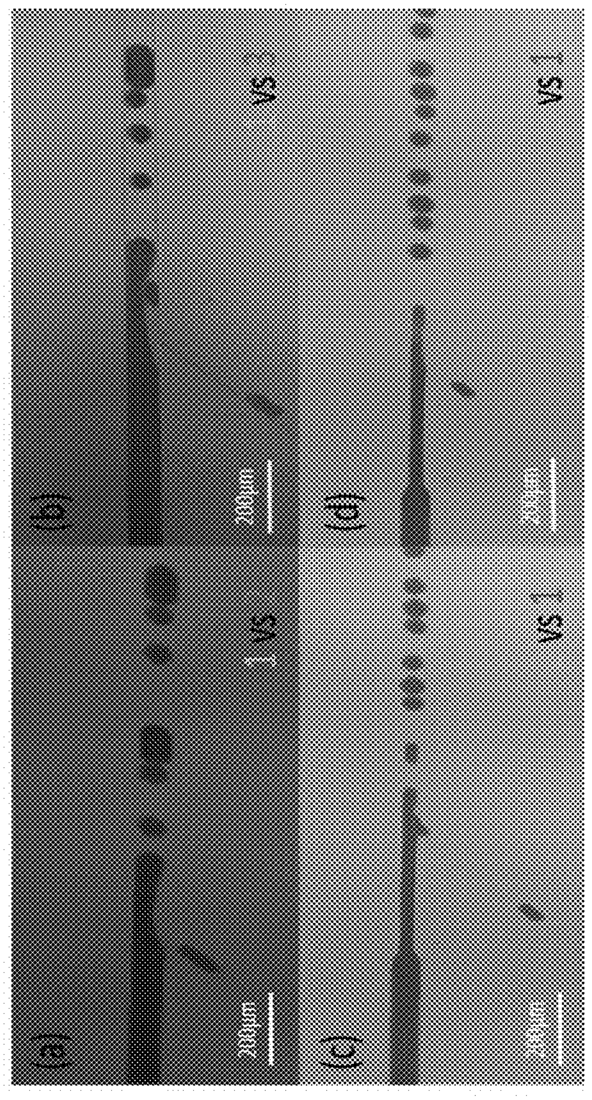
FIG. 9 is a set of micrographs showing an embodiment achieving high-efficiency droplet cleaving and pairing at different ratios (1 vs 2 (a) and 1 vs 3 (b)) by adjusting the droplet reflow, oil spacing, and aqueous cleaved droplet flow rates. Micrographs of inverse ratios (2 vs 1 (c) and 3 vs 1 (d)) by adjusting the channel width, droplet reflow, oil spacing, and aqueous cleaved droplet flow rates are also shown.

Variation 1—Different droplet pairing ratios. This variation entails the ordered reflow of droplets by the surrounding oil (or other phase), the addition of spacing to optimize the droplet frequency, and tuning of flow rates to match droplets at different ratios using cleaving and auto-synchronization. Adjusting the reflow rate, spacing inlet flow rate, continuous phase flow rate, and channel dimension, different combinations of droplets can be obtained to acquire a range of matched droplet combinations. Droplet combinations of (but not limited to) three-to-one, two-to-one, one-to-two, and one-to-three were obtained at a high droplet merging efficiency, showing the diverse and robust capability of this tool as a novel manipulation technique. FIG. 9 is a set of micrographs showing an embodiment achieving high-efficiency droplet cleaving and pairing at different ratios (1 vs 2 (a) and 1 vs 3 (b)) by adjusting the droplet reflow, oil spacing, and aqueous cleaved droplet flow rates. Micrographs of inverse ratios (2 vs 1 (c) and 3 vs 1 (d)) by adjusting the channel width, droplet reflow, oil spacing, and aqueous cleaved droplet flow rates are also shown. This also includes droplets of different sizes, as different flow rate combinations can be easily tuned to acquire different size cleaved droplets. FIG. 9 demonstrates the effect of different droplet ratio synchronization. Droplet reflow and spacing rate to be flown into the cleaving/synchronization layer are optimized for different ratio matching of droplets (i.e. 3:1, 2:1, 1:1, 1:2, 1:3). Micrograph images depict the optimization of these inlet flow rates to obtain a variety of droplet pairing schemes which include different matching ratios of droplets.

Figure 10:
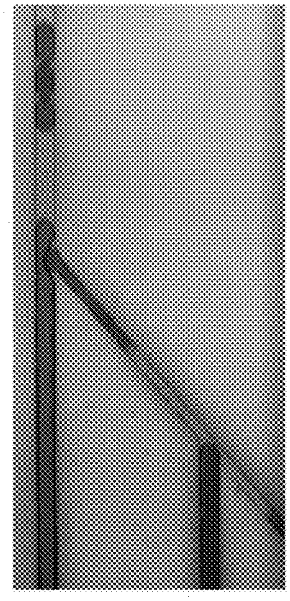
FIG. 10 is a micrograph image of an embodiment of serial cleaving for pairing multiple droplets.

Variation 2— Serial droplet merging. By having repeated droplet cleaving structures and optimizing flow conditions, multiple droplet merging combinations (including, but not limited to 1-1-1, 2-1-1, 3-1-1, 4-1-1, 1-1-1-1, etc.) can be achieved. FIG. 10 demonstrates the effect of serial droplet cleaving/synchronization. Reflowed droplets cleave two parallel continuous phase streams to create serial combinations of droplets. This can include any combination of serial droplets with the desired ratio and concentration. Furthermore, additional serial continuous streams can be included to obtain four, five, or more droplets that are automatically cleaved/synchronized.

Figure 11:
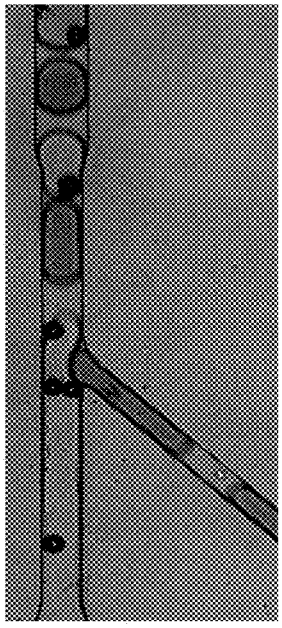
FIG. 11 is a micrograph image of an embodiment of multi-emulsion auto-synchronized droplet cleaving when the droplet encapsulates large microbeads (29 μm diameter).
Figure 12:
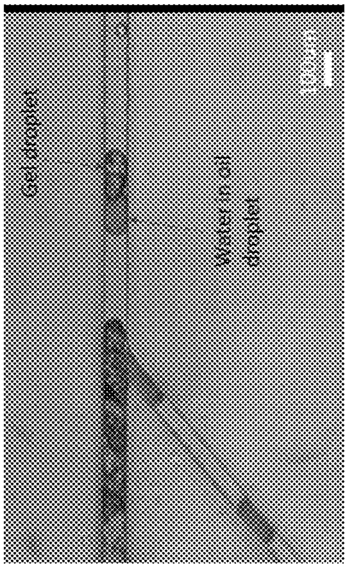
FIG. 12 is an image showing an embodiment of gel droplet containing fluorescent beads in aqueous solution being cleaved and auto-synchronized with the water-in-oil emulsion droplets that cleave the aqueous solution.

Variation 3—Different aqueous phase content. Droplets are reflowed and spaced in a controlled manner, cleaving an adjacent continuous phase containing (but not limited to) biochemical reagents, large beads (FIG. 11), large particles, and/or gel droplets which are relatively close in diameter to the encapsulated droplet. This scheme can lead to the generation of a double emulsion (or more, i.e. triple, quadruple, core/shell, multicore, etc.) droplet that is cleaved and synchronized simultaneously on-the-fly to create high efficiency complex droplet schemes for higher end droplet assays. FIG. 12 demonstrates multi-emulsion droplet cleaving/synchronization. Reflowed droplets cleave a continuous phase containing large particles, beads, cells, and/or hydrogels (all suspended, in some cases reflowed) to create multi-emulsion droplets. This can also be considered for multi-gel-based multi-core/shell structures or other core/shell structure suspended in a solution. Image shows a gel droplet containing fluorescent beads in a solution being cleaved and synchronized with an emulsion droplet.

In certain embodiments, the droplet reflow, cleaving, synchronization, and merging of the droplets are integrated on a single chip to accomplish a 99.9% efficiency at each manipulation step. The field of droplet microfluidics has yet to produce a fully integrated microfluidic system that can conduct complex screens at a high efficiency (even 95% is difficult to obtain). Furthermore, the use of a continuous phase and adjacent reflowed droplet to conduct on-the-fly droplet cleaving (new term for on-the-fly droplet generation as provided in this disclosure) and synchronization is a novel technique to accomplish 99.9% platform efficiency. Lastly, accomplishing a 99.9% efficiency reflow and synchronization leads to the realization of obtaining a downstream merging efficiency of 99.9%, which is imperative for stable high efficiency droplet microfluidic screening platforms with low false-positive and false-negative results. The demonstrated system can be utilized as a cornerstone platform for the development of a range of unprecedented ultra-high efficiency droplet screening systems capable of rapidly conducting complex assays for a variety of screening applications.

Certain embodiments include an apparatus defined as a system of microfluidic channels within a liquid sample testing and/or analysis device. The system of microfluidic channels can include a single layer of microfluidic channels or multiple layers of microfluidic channels stacked in any spatial direction with respect to the base plane. Certain embodiments include an apparatus to accomplish ultra-high platform efficiency droplet operations (e.g. greater than 99.9% platform operation efficiency) utilizing sloped/angled/curved channel microfluidic features to smoothly transition two phase or multi-emulsion droplets (e.g., w/o/w or o/w/o emulsion) from one area of the microfluidic system to another, on-the-fly droplet cleaving/synchronization of two-phase or multi-emulsion droplets (e.g. particles, beads, gels, core/shell, multi-core/shell), and droplet merging. The droplet cleaving region can consist of two microfluidic channels joining at an angle (any angle either smaller or larger than 900 in relation to an adjacent channel), where the oil phase of water-in-oil (or water phase of oil-in-water) emulsion droplets flowing in one channel flows into another channel with aqueous flow (oil flow), resulting in cleaving of water-in-oil (oil-in-water) emulsion droplets in the second channel. In certain embodiments, cleaving entails the production of droplets using a 1°-89°/91°-179° junction. This can include the reflow of droplets from one or both channels, or any combination of biological agents, materials, or reagents. The initial droplet and then newly cleaved droplets are automatically synchronized and placed in close proximity (or in direct contact). These two or more synchronized droplets can be merged using various coalescence methods, including but not limited to electric field-based droplet merging methods (e.g. electrocoalescence). The initial droplets can flow into the aqueous (oil) flow channel through a sloped/angled/curved features through a "transition region" which includes any feature in the non-normal plane with respect to the X, Y, or Z plane. The transition region here can be within a single microfluidic channel, adjacent microfluidic channels, or in any spatial orientation to transition the droplets. The transition region can be found between two microfluidic layers to transition the droplets from one channel layer to a subsequent channel layer. The transition region may consist of sloped/angled/curved wall features either in a single layer, in adjacent layers, or in conjoining layers. The transition region may consist of sloped wall features that are combined partially or fully from any or all adjoining multilayer microfluidic channels. Synchronization includes any form of matching, pairing, ordering prior to droplet merging. This provides a means to get paired droplets in close proximity. Often times this is physical contact, or within 10's of μm from one another. The ratio pairing can be any predetermined ratio, i.e. 3:1, 2:1, 1:1, 1:2, 1:3 etc.

Certain embodiments include a final integrated system that achieves 99.9% (or higher) platform efficiency in droplet operations. Certain embodiments include a final integrated system that achieves 99.9% (or higher) efficiency droplet reflow. Certain embodiments include a final integrated system that achieves 99.9% (or higher) droplet synchronization. Certain embodiments include a final integrated system that achieves 99.9% (or higher) droplet merging. Certain embodiments include the integration of reflow, cleaving/auto-synchronization, and merging functions with other/additional upstream or downstream functionalities such as droplet generation, merging, splitting, incubation, detection, sorting, release (droplet-to-aqueous or similar method), valving, or hit recovery. This technology reduces error rate, increases overall platform efficiency, reduces the time/cost to conduct an assay, and reduces the required time to acquire a hit of interest.

EXAMPLES

Materials. Negative photoresist SU-8 2050 was purchased from MicroChem® (Westborough, MA, USA). Polydimethylsiloxane (PDMS) Sylgard 184 were purchased from Dow Corning (MI, USA). Fluorinated oil, Novec 7500 was purchased from 3M™ (Saint Paul, MN, USA). Surfactant, Pico-Surf™ 2, were purchased from Sphere Fluidics (Cambridge, UK). The 1 μm Fluoresbrite®PolyFluor® 407 beads (2.5% aqueous suspension, emission max=407 nm) were purchased from Polysciences, Inc. (PA, USA). Gentamicin 50 mg/mL and Lysogeny Broth media (LB) was purchase from Sigma-Aldrich (St Louis, MO, USA).

Drug Screening. A drug screening experiment was conducted using *Salmonella Typhimurium* as a cell model. The droplet containing antibiotic was screened out at 1:100 ratio. This approach can be utilized as an innovative technology for a variety of applications that require the development of complex integrated droplet microfluidic assays which need to accomplish high-efficiency functional droplet manipulation techniques. *Salmonella Typhimurium* was chosen as a cell model. *Salmonella Typhimurium* (strain ATCC 14028S) engineered with a GFP plasmid (pCM 18) was inoculated to a culture tube containing 3 mL Lysogeny broth (LB) media and 50 μg/mL erythromycin, followed by incubation at 37° C. overnight. The bacteria were diluted (OD>1) to an ideal concentration (OD between 0.2-0.25) with LB media before reinjecting to the device as the continuous aqueous flow. Two conditions of water-in-oil droplets (size 55-60 μm) were prepared for the reflow and cleaving, the control condition with only LB media in the droplet and the treatment condition with antibiotic and indicator. Gentamicin is used to act as an unknown antibiotic for inhibiting bacteria growth, and it was diluted with LB media to 1 mg/mL. After droplet merging the gentamicin concentration should be diluted by around 3-4 times (depend on the exact size of cleaved droplets). 50 μl of the 1 μm PolyFluor® 407 bead was added to the prepared gentamicin solution as an indicator. The two conditions of droplets were mixed at two different ratios 1 (treatment) vs 1 (control) and 1 (treatment) vs 100 (control). The mixed droplets were then ready for reflowing, cleaving the continuous-phase flow containing bacteria, and merging with the cleaved *Salmonella*.

Ranges provided herein are understood to be shorthand for all of the values within the range. For example, a range of 1 to 20 is understood to include any number, combination of numbers, or sub-range from the group consisting of 1, 2, 3, 4, 5, 6, 7, 8, 9, 10, 11, 12, 13, 14, 15, 16, 17, 18, 19, and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 20 can comprise 1 to 5, 1 to 10, 11 to 15, and 15 to 20 in one direction, or 20 to 15, 15 to 10, 10 to 1, and 10 to 5 in the other direction.

The embodiments have been illustrated with specific examples; however, as will be appreciated by those skilled in the art, various substitutions can be made for the specific elements and process steps disclosed herein and these embodiments may take other forms within the spirit of the structures and methods described herein. Variations and modifications will occur to those skilled in the art, and all such variations and modifications are considered to be part of the disclosure, as defined in the claims.

What is claimed is:

1. A droplet production system, comprising:

a droplet cleaving unit comprising two or more microfluidic channels, wherein a first continuous-phase fluid flows in a first microfluidic channel, a second fluid comprising a first set of multi-phase emulsion droplets flows in a second microfluidic channel, and wherein the first continuous-phase fluid in the first microfluidic channel is cleaved into a second set of droplets through the use of the multi-phase emulsion droplets in the second microfluidic channel;

a droplet auto-synchronization unit configured to places the first set of multi-phase emulsion droplets in close proximity to the second set of droplets generated from cleaving of the continuous-phase flow to form paired droplets, wherein a pairing ratio between the first set and second set of droplets varies depending on the conditions utilized in the droplet production system; and a merging unit that merges the paired droplets into a single droplet;

and wherein the droplet production system is configured to achieve high-efficiency droplet pairing and merging.

2. The droplet production system of claim 1, wherein the paired droplets are merged using an electric field, acoustic wave, convective heating, or other droplet merging methods.

3. The droplet production system of claim 2, wherein one or more meandering channels or merging zones are present and are placed to allow the paired droplets to be merged at more than one location.

4. The droplet production system of claim 1, wherein flow of the second fluid is adjusted to vary size of the multi-phase emulsion droplets, rate of flow, and spacing between the multi-phase emulsion droplets.

5. The droplet production system of claim 1, wherein size of the second set of droplets is varied by adjusting one or more of flow of the continuous-phase fluid or the second fluid, dimensions of the first microfluidic channel, or dimensions of the second microfluidic channel.

6. The droplet production system of claim 1, wherein various pairing ratios are obtained by adjusting flow parameters of the continuous-phase fluid or the second fluid or both.

7. The droplet production system of claim 1, wherein the one or more of droplet cleaving and the droplet auto-synchronization units are connected in series to create two or more paired droplets for merging.

8. The droplet production system of claim 1, wherein the continuous-phase fluid, the second fluid, or both contain one or more reagents, microparticles, microbeads, and/or cells.

9. The droplet production system of claim 1, wherein the two or more microfluidic channels are stacked in any spatial direction with respect to a base plane of the system.

10. A fluid sample testing system, comprising:

the droplet cleaving unit comprising two or more microfluidic channels, wherein a fluid sample flows in a first microfluidic channel, a first fluid comprising a first set of multi-phase emulsion droplets flows in a second microfluidic channel, and wherein the fluid sample in the first microfluidic channel is configured to be cleaved into a second set of droplets through the use of the multi-phase emulsion droplets in the second microfluidic channel;

a droplet auto-synchronization unit configured to places the first set of multi-phase emulsion droplets from the first fluid in close proximity to the second set of droplets generated from the fluid sample by cleaving to form paired droplets, wherein a pairing ratio between the first set of droplets and second set of droplets varies depending on the conditions utilized in the fluid sample testing system; and a merging unit that merges the paired droplets into a single merged droplet-, wherein the fluid sample testing system is configured to achieve high-efficiency droplet pairing and merging.

11. The fluid sample testing system of claim 10, wherein the paired droplets are merged using an electric field, acoustic wave, convective heating, or other merging methods.

12. The fluid sample testing system of claim 10, wherein one or more meandering channels or merging zones are present and are placed to allow the paired droplets to be merged at more than one location.

13. The fluid sample testing system of claim 10, wherein flow of the first fluid is adjusted to vary size of the multi-phase emulsion droplets, rate of flow, and spacing between the multi-phase emulsion droplets.

14. The fluid sample testing system of claim 10, wherein size of the second set of droplets is varied by adjusting one or more of flow of the fluid sample or the first fluid, dimensions of the first microfluidic channel, or dimensions of the second microfluidic channel.

15. The fluid sample testing system of claim 10, wherein various droplet pairing ratios are obtained by adjusting flow parameters of the fluid sample or the first fluid or both.

16. The fluid sample testing system of claim 10, wherein the fluid sample, the first fluid, or both contains one or more reagents, microparticles, microbeads, cells, or combinations thereof.

17. The fluid sample testing system of claim 10, wherein the merged droplet contains two or more reagents, hydrogels, beads, particles, cells, or combinations thereof.

18. The fluid sample testing system of claim 10, wherein the two or more microfluidic channels are stacked in any spatial direction with respect to a base plane of the system.

* * * * *